United States Patent
Raghavan et al.

(10) Patent No.: US 11,800,579 B2
(45) Date of Patent: Oct. 24, 2023

(54) ESTABLISHMENT OF MILLIMETER WAVE RELAY LINKS BETWEEN USER EQUIPMENTS WITH BASE STATION COORDINATION

(71) Applicant: QUALCOMM Incorporated, San Diego, CA (US)

(72) Inventors: Vasanthan Raghavan, West Windsor Township, NJ (US); Tianyang Bai, Bridgewater, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/867,120

(22) Filed: May 5, 2020

(65) Prior Publication Data
US 2020/0359435 A1 Nov. 12, 2020

Related U.S. Application Data

(60) Provisional application No. 62/844,361, filed on May 7, 2019.

(51) Int. Cl.
*H04W 76/14* (2018.01)
*H04W 16/28* (2009.01)
(Continued)

(52) U.S. Cl.
CPC .......... *H04W 76/14* (2018.02); *H04B 17/318* (2015.01); *H04B 17/336* (2015.01);
(Continued)

(58) Field of Classification Search
CPC . H04W 76/14; H04W 16/28; H04W 74/0833; H04W 72/042; H04W 76/18;
(Continued)

(56) References Cited

U.S. PATENT DOCUMENTS 10,484,926 B2* 11/2019 Panteleev ............. H04W 40/22
10,917,222 B2* 2/2021 McDonnell ............... H04L 5/14
(Continued)

OTHER PUBLICATIONS

International Search Report and Written Opinion—PCT/US2020/031684—ISA/EPO—dated Jul. 6, 2020 (192291 WO).

*Primary Examiner* — Ajit Patel
*Assistant Examiner* — Wilfred Thomas
(74) *Attorney, Agent, or Firm* — Holland & Hart LLP

(57) ABSTRACT

Methods, systems, and devices for wireless communications are described. Aspects may include a base station coordinating a first UE and a second UE establishing relay link for directly communicating with one and other. In some cases, the relay link may be a beamformed relay link and the base station and one of the UEs may use to the relay link to communicate if a direct communication link between the base station and the UE fails. The base station may transmit reference signal information to the first and second UE for establishing a relay link. The first and second UE may perform one or more relay link beam sweeping procedures based on the reference signal information and establish the relay link based on the beam sweep procedures. In some cases, coordinating the relay link may be based on one of the UEs transmitting a triggering message to the base station.

30 Claims, 17 Drawing Sheets

(51) Int. Cl.
*H04W 74/08* (2009.01)
*H04B 17/336* (2015.01)
*H04B 17/318* (2015.01)
*H04L 5/00* (2006.01)

(52) U.S. Cl.
CPC .......... *H04L 5/0051* (2013.01); *H04W 16/28* (2013.01); *H04W 74/0833* (2013.01)

(58) Field of Classification Search
CPC ... H04W 88/04; H04B 17/336; H04B 17/318; H04B 7/088; H04B 7/0695; H04L 5/0051
See application file for complete search history.

(56) References Cited

U.S. PATENT DOCUMENTS

| | | | |
|---|---|---|---|
| 2010/0014463 A1* | 1/2010 | Nagai | H04W 72/0426 370/328 |
| 2010/0157845 A1* | 6/2010 | Womack | H04W 76/14 370/254 |
| 2014/0241262 A1 | 8/2014 | Novak et al. | |
| 2015/0103701 A1* | 4/2015 | Seo | H04L 5/0055 370/279 |
| 2015/0230263 A1* | 8/2015 | Roy | H04W 64/00 455/452.2 |
| 2017/0367018 A1* | 12/2017 | Huang | H04W 8/26 |
| 2018/0027535 A1* | 1/2018 | Guo | H04W 72/04 370/329 |
| 2018/0102826 A1* | 4/2018 | Raghavan | H04B 7/088 |
| 2018/0176042 A1* | 6/2018 | Liu | H04B 7/0456 |
| 2018/0213413 A1 | 7/2018 | Roy et al. | |
| 2018/0270816 A1* | 9/2018 | Li | H04B 7/2656 |
| 2018/0279202 A1* | 9/2018 | Tenny | H04W 76/32 |
| 2018/0351907 A1* | 12/2018 | Ryu | H04W 76/10 |
| 2018/0368004 A1* | 12/2018 | Subramanian | H04B 7/088 |
| 2019/0110281 A1 | 4/2019 | Zhou et al. | |
| 2019/0116605 A1 | 4/2019 | Luo et al. | |
| 2019/0124698 A1 | 4/2019 | Wu et al. | |
| 2019/0158162 A1* | 5/2019 | Ryu | H04B 7/088 |
| 2019/0380099 A1* | 12/2019 | Hakola | H04B 7/088 |
| 2020/0028563 A1* | 1/2020 | Gao | H04L 5/0091 |
| 2020/0314772 A1* | 10/2020 | Roth-Mandutz | H04W 4/90 |
| 2020/0359435 A1* | 11/2020 | Raghavan | H04L 5/0051 |
| 2021/0028850 A1* | 1/2021 | Elliott | H04B 7/0695 |
| 2021/0045076 A1* | 2/2021 | Tomeba | H04B 7/0617 |
| 2021/0112481 A1* | 4/2021 | Martin | H04W 4/80 |
| 2021/0136628 A1* | 5/2021 | Uchiyama | H04W 72/04 |
| 2021/0144606 A1* | 5/2021 | Xu | H04W 36/03 |
| 2021/0176789 A1* | 6/2021 | Takahashi | H04W 16/28 |
| 2021/0243754 A1* | 8/2021 | Zhao | H04W 56/002 |
| 2021/0297842 A1* | 9/2021 | Shrivastava | H04W 28/0284 |
| 2021/0377806 A1* | 12/2021 | Osawa | H04W 4/40 |
| 2022/0149921 A1* | 5/2022 | Nilsson | H04L 27/261 |

\* cited by examiner

SSB Resource

RACH Resource

UE Request for Coordination gNB Triggers Coordiantion

ESTABLISHMENT OF MILLIMETER WAVE RELAY LINKS BETWEEN USER EQUIPMENTS WITH BASE STATION COORDINATION

CROSS REFERENCE

The present Application for Patent claims the benefit of U.S. Provisional Patent Application No. 62/844,361 by RAGHAVAN et al., entitled "ESTABLISHMENT OF MILLIMETER WAVE RELAY LINKS BETWEEN USER EQUIPMENTS WITH BASE STATION COORDINATION," filed May 7, 2019, assigned to the assignee hereof, and expressly incorporated by reference herein.

BACKGROUND

The following relates generally to wireless communications, and more specifically to methods for establishment of millimeter wave relay links between user equipments (UEs) with base station coordination.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications system may implement UEs capable of communicating directly with other UEs. In some cases, a first UE may operate as a relay between a base station and a second UE. In a downlink scenario, the first UE may receive signals from the base station and forward or retransmit the received signal to the second UE. In an uplink scenario, the first UE may receive signals from the second UE and forward or retransmit the received signal to the base station. In some wireless communications systems, various devices (e.g., UEs and base stations) may implement beamforming for improved signal transmission and reception quality. Efficient techniques for performing beam coordination for establishing relay links may enhance network and device efficiency.

SUMMARY

The described techniques relate to improved methods, systems, devices, and apparatuses that support methods for establishment of millimeter wave relay links between UEs with base station coordination. Generally, the described techniques provide for a base station coordinating establishment of a relay link between a first UE and a second UE. A base station may serve both the first UE and the second UE, along with other UEs. The first UE may receive an identifier of the second UE from the base station. The first UE may also receive reference signal information for establishing a relay link with the second UE. The first UE may use the reference signal information to perform a beam sweep procedure with the second UE to establish an initial communication link. In some cases, the first UE and the second UE may perform a RACH procedure to complete the relay link. In some cases, the communication link between the first UE and the base station may fail after establishment of the relay link. The first UE may transmit communications to the base station via the second UE using the relay link and the base station may transmit communications to the first UE via the second UE using the relay link.

A method of wireless communication at a first UE is described. The method may include receiving, from a base station, an identifier of a second UE, the base station serving both the first UE and the second UE, receiving, from the base station, a reference signal configuration for establishing a relay link with the second UE, performing a relay link beam sweep procedure with the second UE based on the reference signal configuration and the identifier, and establishing the relay link with the second UE based on the relay link beam sweep procedure.

An apparatus for wireless communication at a first UE is described. The apparatus may include a processor, memory in electronic communication with the processor, and instructions stored in the memory. The instructions may be executable by the processor to cause the apparatus to receive, from a base station, an identifier of a second UE, the base station serving both the first UE and the second UE, receive, from the base station, a reference signal configuration for establishing a relay link with the second UE, perform a relay link beam sweep procedure with the second UE based on the reference signal configuration and the identifier, and establish the relay link with the second UE based on the relay link beam sweep procedure.

Another apparatus for wireless communication at a first UE is described. The apparatus may include means for receiving, from a base station, an identifier of a second UE, the base station serving both the first UE and the second UE, receiving, from the base station, a reference signal configuration for establishing a relay link with the second UE, performing a relay link beam sweep procedure with the second UE based on the reference signal configuration and the identifier, and establishing the relay link with the second UE based on the relay link beam sweep procedure.

A non-transitory computer-readable medium storing code for wireless communication at a first UE is described. The code may include instructions executable by a processor to receive, from a base station, an identifier of a second UE, the base station serving both the first UE and the second UE, receive, from the base station, a reference signal configuration for establishing a relay link with the second UE, perform a relay link beam sweep procedure with the second UE based on the reference signal configuration and the identifier, and establish the relay link with the second UE based on the relay link beam sweep procedure.

Some examples of the method, apparatuses, and non-transitory computer-readable medium described herein may further include operations, features, means, or instructions for acknowledging reception of the reference signal configuration transmitted by the base station.

Some examples of the method, apparatuses, and non-transitory computer-readable medium described herein may further include operations, features, means, or instructions for transmitting a coordination message that requests the base station to trigger the second UE to perform the relay link beam sweep procedure, where the relay link reference signal configuration may be received based on transmitting the coordination message, and detecting one or more conditions associated with a communication link between the first UE and the base station, where the coordination message may be transmitted based on the detecting.

In some examples of the method, apparatuses, and non-transitory computer-readable medium described herein, performing the relay link beam sweep procedure further may include operations, features, means, or instructions for performing the relay link beam sweep procedure within a synchronization signal block resource using a set of beams to identify a beam pair, where the relay link may be established with the second UE using the beam pair.

In some examples of the method, apparatuses, and non-transitory computer-readable medium described herein, performing the relay link beam sweep procedure further may include operations, features, means, or instructions for performing the relay link beam sweep procedure using a set of wide or pseudo-omni beams, establishing an initial communications link with the second UE using a first beam from the set of wide or pseudo-omni beams, and identifying the first beam from a set of wide or pseudo-omni beams based on a reference signal received power (RSRP), reference signal received quality (RSRQ), SNR, signal-to-interference and noise ratio (SINR), a received signal strength indicator (RSSI) metric or a combination thereof.

Some examples of the method, apparatuses, and non-transitory computer-readable medium described herein may further include operations, features, means, or instructions for identifying a set of additional reference signal configurations, based on establishing the initial communications link, for a relay link beam training procedure with the second UE to identify a narrow beam from a set of narrow beams, and performing the relay link beam training procedure with the second UE to identify the narrow beam from the set of narrow beams based on at least one of the set of additional reference signal configurations.

Some examples of the method, apparatuses, and non-transitory computer-readable medium described herein may further include operations, features, means, or instructions for transmitting or receiving an indication of the narrow beam, where the relay link may be established using the narrow beam.

In some examples of the method, apparatuses, and non-transitory computer-readable medium described herein, establishing the relay link may include operations, features, means, or instructions for performing a random access channel procedure with the second UE using a random access channel resource to establish the relay link using a beam identified in the relay link beam sweep procedure.

Some examples of the method, apparatuses, and non-transitory computer-readable medium described herein may further include operations, features, means, or instructions for receiving from the base station an indication of the random access channel resource.

Some examples of the method, apparatuses, and non-transitory computer-readable medium described herein may further include operations, features, means, or instructions for receiving, from the base station, a set of identifiers associated with a set of UEs, selecting the second UE from the set of UEs based on the set of identifiers, and selecting a subset of second UEs from the set of UEs for simultaneous reception from the first UE and relay link establishment with the first UE.

Some examples of the method, apparatuses, and non-transitory computer-readable medium described herein may further include operations, features, means, or instructions for receiving one or more of directional beam information or timing offset information from the base station, where the relay link beam sweep procedure may be performed using the directional beam information, the timing offset information, or both.

In some examples of the method, apparatuses, and non-transitory computer-readable medium described herein, the directional beam information may be based on relative positions of the first UE and the second UE, prior beam pair reports from the first UE and the second UE to the base station, UE antenna configuration or capability information of the first UE and the second UE, an estimate at the base station of the channel state information between the first UE and the second UE, or a combination thereof.

In some examples of the method, apparatuses, and non-transitory computer-readable medium described herein, receiving the relay link reference signal configuration may include operations, features, means, or instructions for receiving one or more of a downlink relay link reference signal configuration or an uplink relay link reference signal configuration.

Some examples of the method, apparatuses, and non-transitory computer-readable medium described herein may further include operations, features, means, or instructions for receiving data from the base station via the second UE and the relay link based on establishing the relay link with the second UE.

Some examples of the method, apparatuses, and non-transitory computer-readable medium described herein may further include operations, features, means, or instructions for transmitting data to the base station via the second UE and the relay link based on establishing the relay link with the second UE.

In some examples of the method, apparatuses, and non-transitory computer-readable medium described herein, the identifier includes one or more of a radio network temporary identifier, a temporary mobile subscriber identity, a temporary identity, or any combination thereof.

In some examples of the method, apparatuses, and non-transitory computer-readable medium described herein, the relay link reference signal configuration may be triggered based on one or more of a power metric, a thermal metric, a maximum permissible exposure limit, a link budget, a blockage condition, or a channel environment condition.

A method of wireless communication at a base station is described. The method may include transmitting, to a first UE, an identifier of a second UE, transmitting, to the first UE and the second UE, a reference signal configuration for performing a relay link beam sweep procedure for establishing a relay link between the first UE and the second UE, and receiving an indication, from at least one of the first UE or the second UE, that the relay link has been established between the first UE and the second UE.

An apparatus for wireless communication at a base station is described. The apparatus may include a processor, memory in electronic communication with the processor, and instructions stored in the memory. The instructions may be executable by the processor to cause the apparatus to transmit, to a first UE, an identifier of a second UE, transmit, to the first UE and the second UE, a reference signal configuration for performing a relay link beam sweep procedure for establishing a relay link between the first UE and the second UE, and receive an indication, from at least one of the first UE or the second UE, that the relay link has been established between the first UE and the second UE.

Another apparatus for wireless communication at a base station is described. The apparatus may include means for transmitting, to a first UE, an identifier of a second UE, transmitting, to the first UE and the second UE, a reference signal configuration for performing a relay link beam sweep procedure for establishing a relay link between the first UE and the second UE, and receiving an indication, from at least one of the first UE or the second UE, that the relay link has been established between the first UE and the second UE.

A non-transitory computer-readable medium storing code for wireless communication at a base station is described. The code may include instructions executable by a processor to transmit, to a first UE, an identifier of a second UE, transmit, to the first UE and the second UE, a reference signal configuration for performing a relay link beam sweep procedure for establishing a relay link between the first UE and the second UE, and receive an indication, from at least one of the first UE or the second UE, that the relay link has been established between the first UE and the second UE.

Some examples of the method, apparatuses, and non-transitory computer-readable medium described herein may further include operations, features, means, or instructions for receiving an acknowledgment from at least one of the first and the second UE of the reception of the relay link reference signal configuration.

Some examples of the method, apparatuses, and non-transitory computer-readable medium described herein may further include operations, features, means, or instructions for determining a relative location between the first UE and the second UE based on a location estimation signal, determining a set of UEs including the second UE that may be candidates for establishing the relay link with the first UE based on relative locations between the set of UEs and the first UE, selecting the second UE as a candidate for establishing the relay link with the first UE based on the relative location, and transmitting, to the first UE, identifiers of the set of UEs.

In some examples of the method, apparatuses, and non-transitory computer-readable medium described herein, transmitting the reference signal configuration may include operations, features, means, or instructions for transmitting one of a downlink reference signal configuration or an uplink reference signal configuration, information to the first UE, and transmitting the other of the downlink reference signal configuration or the uplink reference signal configuration to the second UE.

Some examples of the method, apparatuses, and non-transitory computer-readable medium described herein may further include operations, features, means, or instructions for transmitting, to the first UE and the second UE, directional beam information for the first UE, the second UE, or both.

Some examples of the method, apparatuses, and non-transitory computer-readable medium described herein may further include operations, features, means, or instructions for transmitting, to the first UE and the second UE, timing offset information for the first UE, the second UE, or both.

Some examples of the method, apparatuses, and non-transitory computer-readable medium described herein may further include operations, features, means, or instructions for receiving a coordination message that requests the base station to trigger a relay link beam sweep procedure with another UE, where the reference signal configuration may be transmitted based on receiving the coordination message.

In some examples of the method, apparatuses, and non-transitory computer-readable medium described herein, the reference signal configuration indicates a synchronization signal block resource in which to perform a relay link beam sweep procedure.

Some examples of the method, apparatuses, and non-transitory computer-readable medium described herein may further include operations, features, means, or instructions for transmitting an indication of a random access resource to the first UE, the second UE, or both.

Some examples of the method, apparatuses, and non-transitory computer-readable medium described herein may further include operations, features, means, or instructions for identifying data to be transmitted to the first UE, and transmitting the data to the second UE with instructions to forward to the data to the first UE via the relay link.

Some examples of the method, apparatuses, and non-transitory computer-readable medium described herein may further include operations, features, means, or instructions for detecting a metric associated with a communication link between the base station and the first UE, and transmitting the identifier of the second UE to the first UE based on detecting the metric.

In some examples of the method, apparatuses, and non-transitory computer-readable medium described herein, the metric includes one or more of a signal quality measurement, a sensor measurement, a power measurement, a maximum permissible exposure metric, a link budget, or a channel sensing metric.

In some examples of the method, apparatuses, and non-transitory computer-readable medium described herein, the reference signal configuration may be based on one or more of a power metric, a thermal metric, a maximum permissible exposure limit, a link budget, or a channel environment condition.

In some examples of the method, apparatuses, and non-transitory computer-readable medium described herein, the identifier includes one or more of a radio network temporary identifier, a temporary mobile subscriber identity, or a temporary identity.

DETAILED DESCRIPTION

Figure 1:
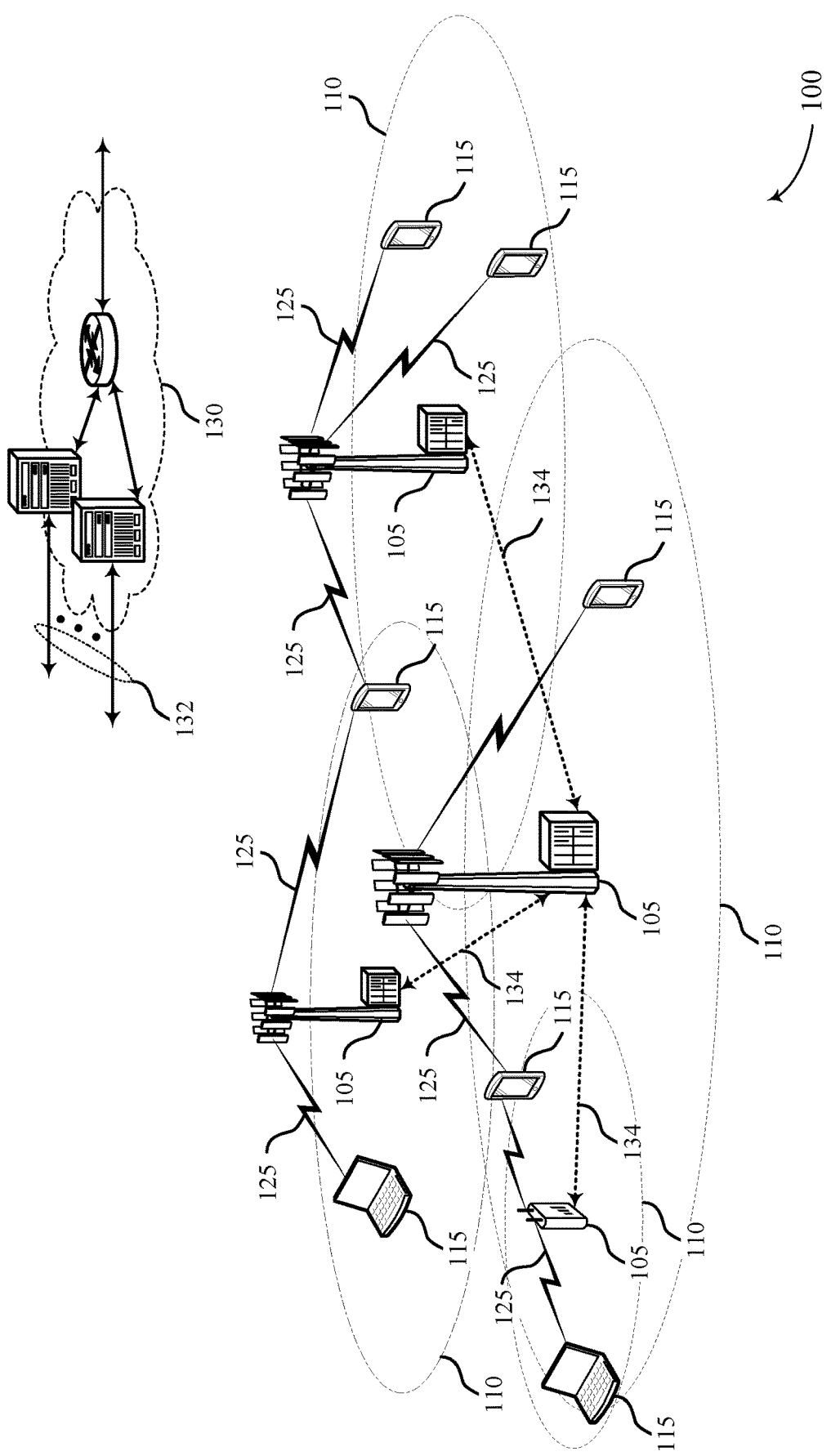
FIG. 1 illustrates an example of a system for wireless communications that supports establishment of millimeter wave relay links between UEs with base station coordination in accordance with aspects of the present disclosure.

Wireless communications system may include UEs capable of communicating directly with other UEs. In some cases, a second UE may operate as a relay between a base station and a first UE. In a downlink scenario, the second UE may receive signals from the base station, amplify, decode or process the signals and forward or retransmit the received signal to the first UE. In an uplink scenario, the second UE may receive signals from the first UE and forward or retransmit the received signal to the base station. A relay link may be useful in some high density scenarios, such as dense areas (e.g., a high concentration of buildings or structures), populated areas such as stadiums, shopping malls, offices, downtown areas, etc., during special events, or in other scenarios or locale. In such cases, a blocker (e.g., a physical object that interferes with radio-frequency signals) may interfere with an established link between a base station and a UE. The UE and another UE may establish the relay link in response to the blocking object to continue communication with the base station. In some cases, relaying between UEs in a communication system may be referred to as network-assisted UE cooperation (NAUC) or network controlled interactive services (NCIS) for high density UE settings. Note that the blocker example is used for illustrative purposes and other use-cases for relay link are possible.

In some wireless communications systems, various devices (e.g., UEs and base stations) may implement beamforming for improved signal transmission and reception quality. UEs in a relay scenario may further utilize beamforming techniques for improved signal transmission and reception quality. A base station may control one or more aspects of beam coordination between UEs for establishing a relay link. A base station may transmit an identifier of a second UE to a first UE and the first UE may use the identifier to establish a relay link with the second UE. The base station may also transmit reference signal information to the first and second UEs, which the first and second UE may use to coordinate initial signaling or beam training. In some cases, the first and second UEs may use the reference signal information to establish an initial communication link using wide beams. The first and second UEs may perform additional beam sweeping procedures to determine a set of narrow beams to establish the relay link. In some cases, the first and second UEs may receive directional beam information from the base station and perform a narrow beam sweeping procedure without first establishing an initial link using wide beams.

After establishing the relay link, one of the communication links between a UE and the base station may fail. For example, a communication link between the first UE and the base station may become blocked or fade due to Doppler. The first UE may transmit information to the base station via the second UE using the relay link and the base station may transmit information to the first UE via the second UE using the relay link. In some cases, the relay link may be used to perform a beam recovery procedure between the first UE and the base station.

Particular aspects of the subject matter described herein may be implemented to realize one or more advantages. The described techniques may support improvements in the communicating in a relay link framework, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are then described in the context of wireless communications system, communication procedures, resource coordination and process flows. Aspects of the disclosure are further illustrated by and described with reference to apparatus diagrams, system diagrams, and flowcharts that relate to establishment of millimeter wave relay links between UEs with base station coordination.

FIG. 1 illustrates an example of a wireless communications system 100 that supports establishment of millimeter wave relay links between UEs with base station coordination in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The electromagnetic spectrum is often subdivided by various authors/entities into differently identified classes, bands, channels, etc., based on frequency/wavelength. For example, a portion of the electromagnetic spectrum from 30 Hz to 300 GHz is commonly known as the radio spectrum with the corresponding electromagnetic waves often called radio waves.

The International Telecommunications Union (ITU), for example, currently identifies twelve differently named bands in the radio spectrum based on powers of ten meters of wavelength. Here, for example, of particular interest to modern wireless communications are certain radio frequencies/bands within the ITU's very high frequency (VHF) band (30 MHZ-300 MHz), ultra-high frequency (UHF) band (300 MHz-3000 MHz), super high frequency (SHF) band (3000 MHz-30000 MHz), and/or extremely high frequency (EHF) band (30000 MHz-300000 MHz).

In another example, the Institute of Electrical and Electronics Engineers (IEEE) recognizes the same VHF and UHF bands of the ITU, but divides the radio spectrum (300 MHz-300000 MHz), corresponding to the ITU's UHF, SHF and EHF bands, into ten differently named bands.

One of the issues that may arise from having different authors/entities naming portions of the radio spectrum is that some potential confusion may arise. For example, the ITU's EHF band (30000 MHz-300000 MHz) corresponds to wavelengths between 1 mm and 10 mm and as such is often referred to a millimeter wave band. However, the (narrower) IEEE band designated as the "G" band (110000 MHz-300000 MHz) is also often referred to as a millimeter wave band.

For 5G new radio (NR), two initial operating bands have been identified as frequency range designations FR1 (410 MHz-7125 MHz) and FR2 (24250 MHz-52600 MHz). It is expected that other frequency range designations may be identified for 5G, or later generations. Even though a portion of FR1 is greater than both 6 GHz (>6000 MHz) and 7 GHz (>7000 MHz), FR1 is often referred to as a Sub-6 GHz band or a Sub-7 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz, e.g., the lower end of the EHF band), FR2 is often referred to as a millimeter wave band in various documents and articles regarding 5G NR topics. Additionally, all or some of the frequencies between the upper bound of FR1 (currently, 7125 MHz) and the lower band of FR2 (currently, 24250 MHz) are often referred to as mid-band frequencies.

With the above aspects in mind, unless specifically stated otherwise, it should be understood that the term "sub-6 GHz" or the like if used herein by way of example may represent all or part of FR1 for 5G NR. Further, unless specifically stated otherwise, it should be understood that the term "millimeter wave" (mmW) if used herein by way of example may represent all or part of FR2 for 5G NR, and/or all or part of the EHF band.

It should also be understood that the terms "sub-6 GHz" and "millimeter wave" (mmW) are also intended herein to represent modifications to such example frequency bands that may occur do to author/entity decisions regarding wireless communications, e.g., as presented by example herein. For example, unless specifically stated otherwise, it should be understood that the terms "sub-6 GHz" or "millimeter wave" (mmW) if used herein may also represent respective (non-overlapping) portions of the so-called mid-band frequencies.

It should be understood that the above examples are not necessarily intended to limit claimed subject matter. For example, unless specifically recited, claimed subject matter relating to wireless communications is not necessarily intended to be limited to any particular author/entity defined frequency band, or the like.

UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or VHF portion of the spectrum. The SHF region may include bands such as the 5 GHz industrial, scientific, and medical (ISM) bands, which may be used opportunistically by devices that may be capable of tolerating interference from other users.

EHF antennas of the respective devices (e.g., UEs 115 and base stations 105) may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
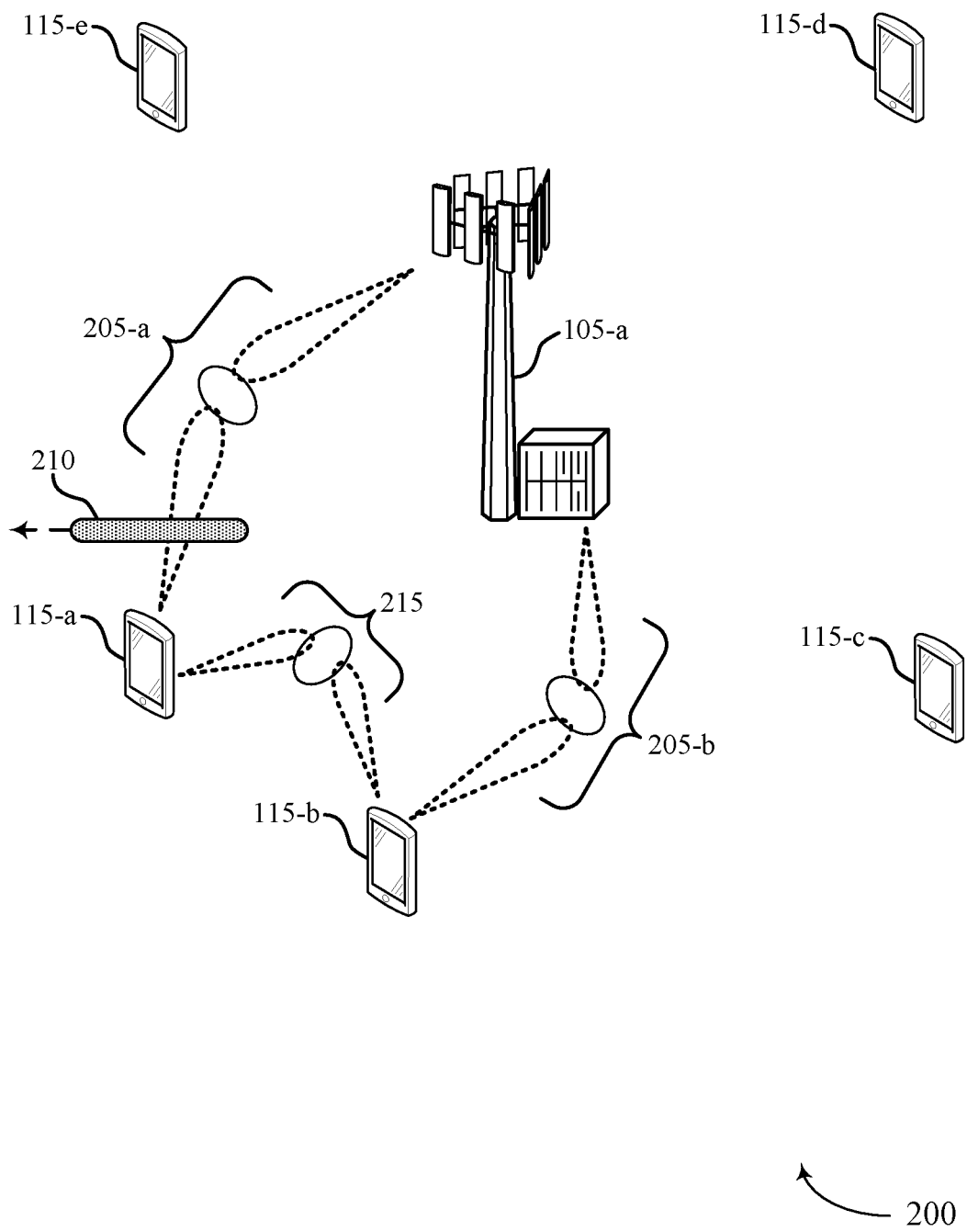
FIG. 2 illustrates an example of a wireless communications system that supports establishment of millimeter wave relay links between UEs with base station coordination in accordance with aspects of the present disclosure.

FIG. 2 illustrates an example of a wireless communications system 200 that supports establishment of millimeter wave relay links between UEs with base station coordination in accordance with aspects of the present disclosure. In some examples, the wireless communications system 200 may implement aspects of wireless communication system 100. The wireless communications system 200 may include UEs 115 and base station 105-a, which may be examples of the UEs 115 and base stations 105 described with reference to FIG. 1. The relay link techniques described herein may be implemented in various types of UEs 115, such as repeater devices or repeaters, UEs configured with repeater functionality, routers, smart nodes, etc.

In some cases, a first UE 115-a may establish or have an established communication link 205-a with the base station 105-a, and a second UE 115-b may establish or have an established communication link 205-b with the base station 105-a. The communication links 205 may be beamformed communication links and each UE 115-a and 115-b may transmit data using its respective communication link 205 to the base station 105-a using mmW transmissions.

In some cases, a communication link 205 may experience one or more conditions such as becoming blocked, faded or otherwise degraded. For example, a blocker 210 may move within the path of the communication link 205-a between the first UE 115-a and the base station 105-a. The blocker 210 may cause the communication link 205-a to fade, degrade, or become blocked. In some examples, the blocker 210 may cause Doppler fading. In some cases, the blocker 210 may be a human, animal, building, vehicle, foliage, etc. In other examples, degradation or Doppler fading of the communication link 205-a may occur due to other factors such as multipath propagation, shadowing, etc.

The base station 105-a or the first UE 115-a may detect the conditions (e.g., fading or degradation) of the communication link 205-a. In some cases, in response to detecting fading or degradation of the communication link 205-a, the base station 105-a or the first UE 115-a may initiate a coordination procedure to establish a relay link 215 between the first UE 115-a and the second UE 115-b. In some examples, the relay link may be used to transfer information between the base station 105-a and the first UE 115-a when the communication link 205-a degrades or fails. In further examples, the second UE 115-b may assist the first UE 115-a in communicating with the network using the relay link, for example, when the first UE 115-a may be out of range of the base station 105-a or moving away from the base station 105-a (e.g., in a vehicle-to-everything/V2X scenario). In yet further examples, multiple relay links can be established to provide a communication channel for a UE.

In some cases, establishing a relay link 215 between the first UE 115-a and the second UE 115-b may include the first UE 115-a receiving, from the base station, an identifier of the second UE 115-b and a reference signal configuration for establishing a relay link with the second UE 115-b. In response, the first UE 115-a may initiate a relay link beam sweep procedure with the second UE 115-b using the identifier of the second UE 115-b and information communicated in the reference signal configuration message that was received from the base station 105-a. Performing the relay link beam sweep procedure may result in the first UE and the second UE establishing the relay link 215, which may be used for transferring communications between the first UE 115-a and the base station 105-a if the first communication link 205-a fails. In some cases, the relay link 215 may be used for performing beam recovery operations between the first UE 115-a and the base station 105-a. In this regard, a UE (e.g., the first UE 115-a) may use a relay link (e.g., the relay link 215) to transmit or receive data or perform a beam failure recovery in the event that the communication link between the UE and a base station fails. In some cases, using a relay link may reduce signaling overhead associated with a beam recovery procedure, such as by reducing the beam training procedures between the UE and base station while re-establishing a communications link (e.g., communication link 205-a).

In some cases, the base station 105-a may serve multiple UEs, 115-a, 115-b, 115-c, 115-d, and 115-e and determine which of the neighboring UEs 115-b through 115-e to the first UE 115-a may be candidates for a discovery process to establish a relay link with the first UE 115-a. Selecting neighboring UEs 115-b through 115-e as candidates may include the base station 105-a evaluating proximity information, signal quality or strength, UE capabilities, or other information associated with the neighboring UEs 115-b through 115-e. In some cases, the base station 105-a may send multiple identifiers, each associated with one or more neighboring UEs 115-b through 115-e, to the first UE 115-a. The first UE 115-a may select at least one UE, for example the second UE 115-b, for performing a coordination procedure to establish a relay link.

Figure 3:
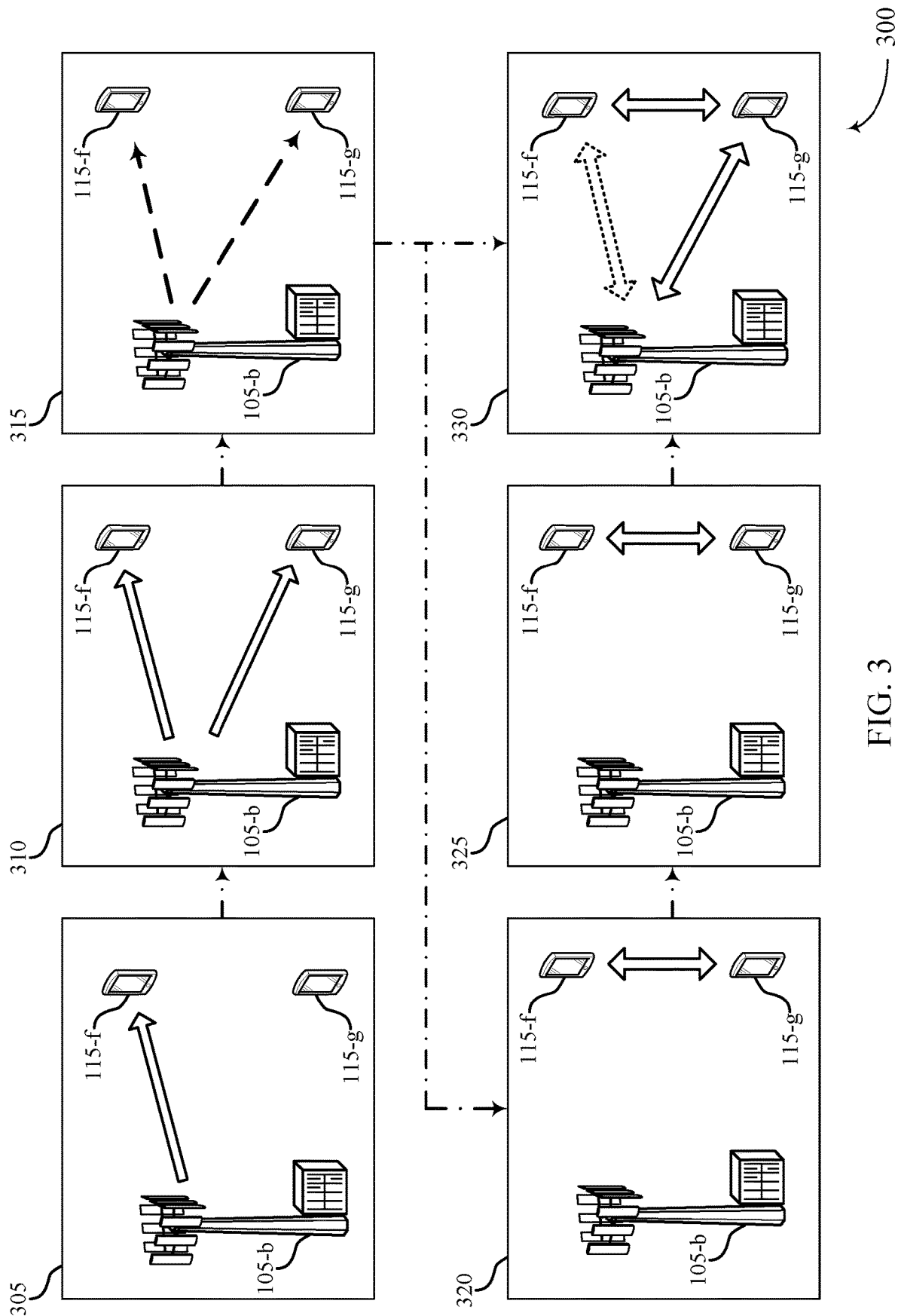
FIG. 3 illustrates an example of coordination procedures that supports establishment of millimeter wave relay links between UEs with base station coordination in accordance with aspects of the present disclosure.

FIG. 3 illustrates an example of the coordination procedures 300 that support establishment of millimeter wave relay links between UEs with base station coordination in accordance with aspects of the present disclosure. In some examples, coordination procedures 300 may implement aspects of wireless communications systems 100 and 200. The communication procedures may include UEs 115-f and 115-g, which may be examples of the UEs 115 described with reference to FIGS. 1 and 2; and a base station 105-b, which may be examples of the base stations 105 described with reference to FIGS. 1 and 2. The coordination procedures 300 may include a target set identification process 305, a reference signal coordination process 310, an initial beamforming information transfer 315, an initial link establishment process 320, a beam training process 325 and a relay link establishment process 330.

At 305, a target set identification process may be performed where the base station 105-*b* sends a first UE 115-*f* information on one or more neighboring UEs for establishing a relay link. In some cases, the base station 105-*b* may determine one or more neighboring UEs (or subset of neighboring UEs) that are potential candidates for establishing the relay link with the first UE 115-*f*. In the illustrated scenario, a second UE 115-*g* is shown, but in other cases the base station 105-*b* may identify more than one neighboring UE as a potential candidate for establishing a relay link with the first UE 115-*g*. The base station 105-*b* may identify the second UE 115-*g* or other neighboring UEs that are candidates based on position information, signal information (such as signal quality, signal strength, one or more beamforming parameters between the neighboring UE and the base station, etc.), a capability of the UEs, or the like. In some cases, the base station 105-*a* may determine a relative location between the first UE 115-*f* and the second UE 115-*g* based at least in part on a location estimation signal. This location estimation signal may be based on specifically designed signals for mmW transmissions or could be based on non-mmW signals (e.g., GPS, global navigation satellite system (GLONASS), etc.). The base station 105-*b* may send an identity of selected UEs, such as UE 115-*g* to the first UE 115-*f*. The base station 105-*b* may send an identity of the second UE 115-*g* to the first UE 115-*f*, which may include a radio network temporary identifier (RNTI, C-RNTI, etc.), a temporary mobile subscriber identity (TMSI, S-TMSI, etc.), a temporary identity (e.g., a temporary identifier used in next update (TIN), or the like), or other unique identifier of the second UE 115-*g*.

In some cases, the base station 105-*a* may initiate the target set identification process 305 based on one or more parameters associated with an established communications link between the base station 105-*b* and the first UE 115-*f*. For example, the first UE 115-*f* may detect fading, failure or blocking of the communications link and send an indication to the base station 105-*b* to initiate the target set identification process 305. In some cases, the base station 105-*b* may detect fading, failure or blocking of the communication link and initiate the target set identification process 305.

At 310, a reference signal coordination process may be performed for initial signaling or beam training. In some cases, the base station 105-*b* may provide the first UE 115-*f* and/or the second UE 115-*g* with reference signal information for initiating a communications link. In some cases, the base station 105-*b* may transmit downlink reference signal information for the first UE 115-*f* to the second UE 115-*g* and transmit uplink reference signal information for the second UE 115-*g* to the first UE 115-*f*, or vice versa. The base station 105-*b* may transmit the reference signal information based on information it has about the first UE 115-*f* and second UE 115-*g* and their relative metrics from communications links established between each UE 115 and the base station 105-*b*. The relative metrics used for communicating the reference signal information may include power information, thermal information, electromagnetic/mmW exposure constraints such as maximum permissible exposure (MPE), a link budget for the UEs 115, channel or environment sensing metric, or the like. In further examples, the UEs 115 may acknowledge that they received the reference signal information by transmitting an indication or receipt acknowledgement to the base station 105-*b*.

At 315, the first UE 115-*f* and the second UE 115-*g* may perform a relay link beam sweep procedure in a variety of ways. In some cases, the base station may provide the UEs with directional beam information, timing offset information, or both, and the UEs may use this information to select an initial set of beams for performing the relay link beam sweep procedure. In some cases, the initial directional beam information may be used by the UEs to initially select a set of narrow beams for performing the beam sweep procedure. In other cases, the base station may not provide the first and second UEs 115-*f*, 115-*g* with directional beam information or timing offset information, and the first and second UEs 115-*f*, 115-*g* may perform one or more additional procedures as part of the beam sweep procedure to establish an initial communications link. For example, the base station 105-*b* may transmit initial beamforming information to the first UE 115-*f* and the second UE 115-*g* for learning the initial beam information.

In examples that the base station does not provide beamforming or timing information at 315, the first UE 115-*f* and the second UE 115-*g* may perform an initial link establishment process at 320. The first UE 115-*f* and the second UE 115-*g* may use the reference signal resources received from the base station 105-*b* at 310 to establish an initial communications link. In some cases, this may include the first UE 115-*f* and the second UE 115-*g* communicating or performing an initial beam sweep procedure using wide beams (e.g., omni-beams or pseudo-omni beams) to coordinate their reference signals for a beam training or a beam refinement procedure. For example, the first UE 115-*f* and the second UE 115-*g* may perform a beam sweeping procedure using wide beams where the UEs 115-*f*, 115-*g* cycle through transmitting and receiving direction beams. In some cases, this may include the first UE 115-*f* or the second UE 115-*g* alternating or sweeping through different direction beams by transmitting multiple different directional beams at different times and receiving measurements of each beam to select a beam for transmissions (e.g., directional beam with highest quality). Similarly, the first UE 115-*g* or the second UE 115-*g* may alternate or sweep through different receive beam directions at different times to select a beam for receiving transmissions. Additionally or alternatively, the first UE 115-*f* and the second UE 115-*g* may use timing information, for example, communicated in the reference signal information at 310, to coordinate their reference signals.

In some cases, establishing the initial communications link by identifying one or more beams from the wide beams may be based on one or more signal metrics associated with the beams. For example, the first UE 115-*f* or the second UE 115-*g* may monitor or measure a reference signal received power (RSRP), reference signal received quality (RSRQ), signal-to-noise ratio (SNR), signal-to-interference and noise ratio (SINR), a received signal strength indicator (RSSI) or a combination thereof. In some cases, establishing the initial communications link may be used to identify further reference signals for the first UE 115-*f* and the second UE 115-*g* or identify narrow beams for performing a beam training procedure.

At 325, the first UE 115-*f* and the second UE 115-*g* may perform a beam training procedure. This may include using information exchanged via an initial communications link established at 315 or 320. The beam training procedure may include the second UE 115-*g* transmitting a number of relaying resource signals for performing the beam training procedure to the first UE 115-*f*. In some cases, the second UE 115-*g* may also transmit random access channel (RACH) resources for performing a RACH procedure to the first UE 115-*f*. The second UE 115-*g* may transmit to the first UE 115-*f* using candidate beams, which may be based on a beamforming candidate from an analog beam codebook. The first UE 115-*f* and the second UE 115-*g* may perform a beam training procedure using the candidate beams until one or more narrow beams are identified for establishing a relay link.

In some cases, the first UE 115-*f* and the second UE 115-*g* may use the one or more beams (e.g., narrow beams) identified in the beam training or beam refinement procedure or based on directional beam information received from the base station to perform a RACH procedure. In some cases, this may include the first UE 115-*f* using a RACH resource to establish a relay link between the first UE 115-*f* and the second UE 115-*g*. Although, aspects of the coordination procedure 300 have been discussed in the context of the first UE 115-*f* operating in a downlink role and the second UE 115-*g* operating in an uplink role, the first UE 115-*f* may operate in an uplink role and the second UE 115-*g* may operate in a downlink role, or combine or switch or appropriately determine the correct roles throughout the coordination procedure 300.

At 330, the first UE 115-*f* and the second IE 115-*g* may establish a relay link. In some cases, the first UE 115-*f* and second UE 115-*g* may establish the relay link using the beam training and RACH procedures performed at 320 and 325. In other cases, for example, where the base station 105-*b* provides directional beam information or timing offset information at process 315, the first UE 115-*f* and the second UE 115-*g* may establish a relay link using this information. In some cases, the first UE 115-*f* or the second UE 115-*g* may transmit an indication to the base station that a relay link has been established between the first UE 115-*f* and the second UE 115-*g*. In some examples, the communication link between the first UE 115-*f* and the base station 105-*b* may fade, deteriorate, or become blocked. In this regard, the first UE 115-*f* and the base station 105-*b* may exchange communications via the relay link. For example, the first UE 115-*f* and the base station may perform a beam recovery procedure using the relay link. In other examples, the first UE 115-*f* may transmit information to the base station 105-*b* via the second UE 115-*g* using the relay link or the base station 105-*f* may transmit information to the first UE 115-*f* via the second UE 115-*g* using the relay link.

Accordingly, in the event that a direct communication link between the first UE 115-*f* and the second UE 115-*g* fails, signaling overhead to re-establish the communication link may be reduced by communicating over the relay link. For example, the first UE 115-*g* may not need to initiate a beam training or RACH procedure with the base station 105-*b*. Another advantage establishing the relay link may be that the first UE 115-*f* and the base station 105-*b* may transmit messages if a direct communication link is not established, and thus, the UE 115-*f* may still have access to the communications network in the absence of a direct communications link.

Figure 4:
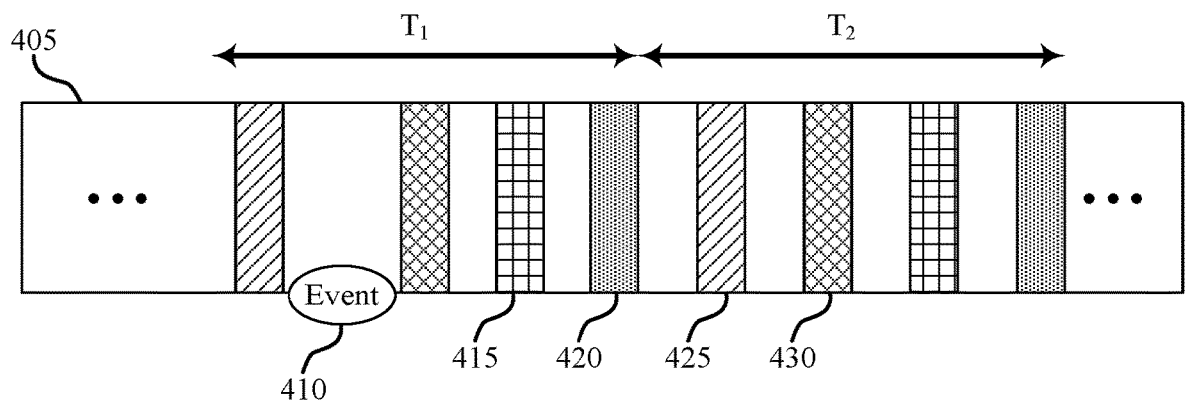
FIG. 4 illustrates an example of periodic resource coordination that supports establishment of millimeter wave relay links between UEs with base station coordination in accordance with aspects of the present disclosure.
Figure 4:
Figure 4:
Figure 4:
Figure 4:

FIG. 4 illustrates an example of a periodic resource coordination procedure 400 that supports establishment of millimeter wave relay links between UEs with base station coordination in accordance with aspects of the present disclosure. In some examples, the periodic resource coordination procedure 400 may implement aspects of wireless communication systems 100 or 200, or aspects of the coordination procedures 300. The resource coordination procedure 400 may be performed by UEs 115 or base stations 105 described with reference to FIGS. 1-3.

In some cases, multiple UEs may be served by a base station. The UEs and base station may perform the periodic resource coordination procedure 400 using a repeating set of resources 405 that occurs during a repeating signal period ($T_{UE\text{-}SSB}$). The signal period could be network configured, be a standard specification defined parameter, or the like. The set of resources 405 may include synchronization signal block (SSB) resource opportunities, which may be the same resources as the base station SSB or may be different resources than the base station SSB. The set of resources may also include RACH resources associated with the SSB resource opportunities, which may be the same or different than the RACH resources associated with the SSB opportunities between a UE and the base station.

During a first time period ($T_1$), a first UE (e.g., first UE 115-*a* or first UE 115-*f*) may experience an event 410 such as signal fading, blocking, beam failure, etc. for a communication link between the first UE and the base station. In further examples, the event 410 could be based on sensor information, for example, a temperature of the first UE, a maximum permissible exposure constraint, link usage, etc. In response to the event 410, the first UE may transmit a request 415 to the base station to coordinate a relay link process with neighboring UEs. The base station may determine a subset of UEs from the neighboring or available UEs for the first UE to perform a beam sweep within a subsequent set of SSB resource opportunities. The base station may send a triggering message 420 to the subset of UEs to perform a beam sweep procedure (e.g., discussed in relation to FIG. 3) in the SSB resources. In some cases, the base station may also provide beamforming or timing information (e.g., as discussed at 310 and 315 in relation to FIG. 3).

In some cases, the base station may inform the first UE to transmit in the SSB resource opportunities, decode a known waveform, and/or perform a RACH procedure with the second UE in the RACH resource opportunities in a subsequent set of resources ($T_2$). The base station may also provide timing offset for synchronization over the resource period (e.g., $T_2$). In some cases, the base station may provide beam information to all the UEs in the beam establishment process. In other cases, the base station may provide beam information to some or a subset of the UEs, (e.g., a transmitting UE in the beam establishment process).

The first UE may identify a second UE from the subset of UEs to perform a beam sweep/beam training procedure. In the second time period, which may be the next set of resources 405 or a subsequent set of resources ($T_2$) the first UE and the second UE may perform the beam sweep procedure 425 using the SSB resources (e.g., process 320 or 325 described with reference to FIG. 3). In some cases, the first UE may perform a downlink beam sweep and the second UE may perform the uplink beam sweep. Although in other cases, the first UE may perform an uplink beam sweep and the second UE may perform a downlink beam sweep. In some cases, the first and second UE may also perform a RACH procedure 430 using the RACH resources to establish a relay link between the first UE and the second UE (e.g., process 330 described with reference to FIG. 3).

Figure 5:
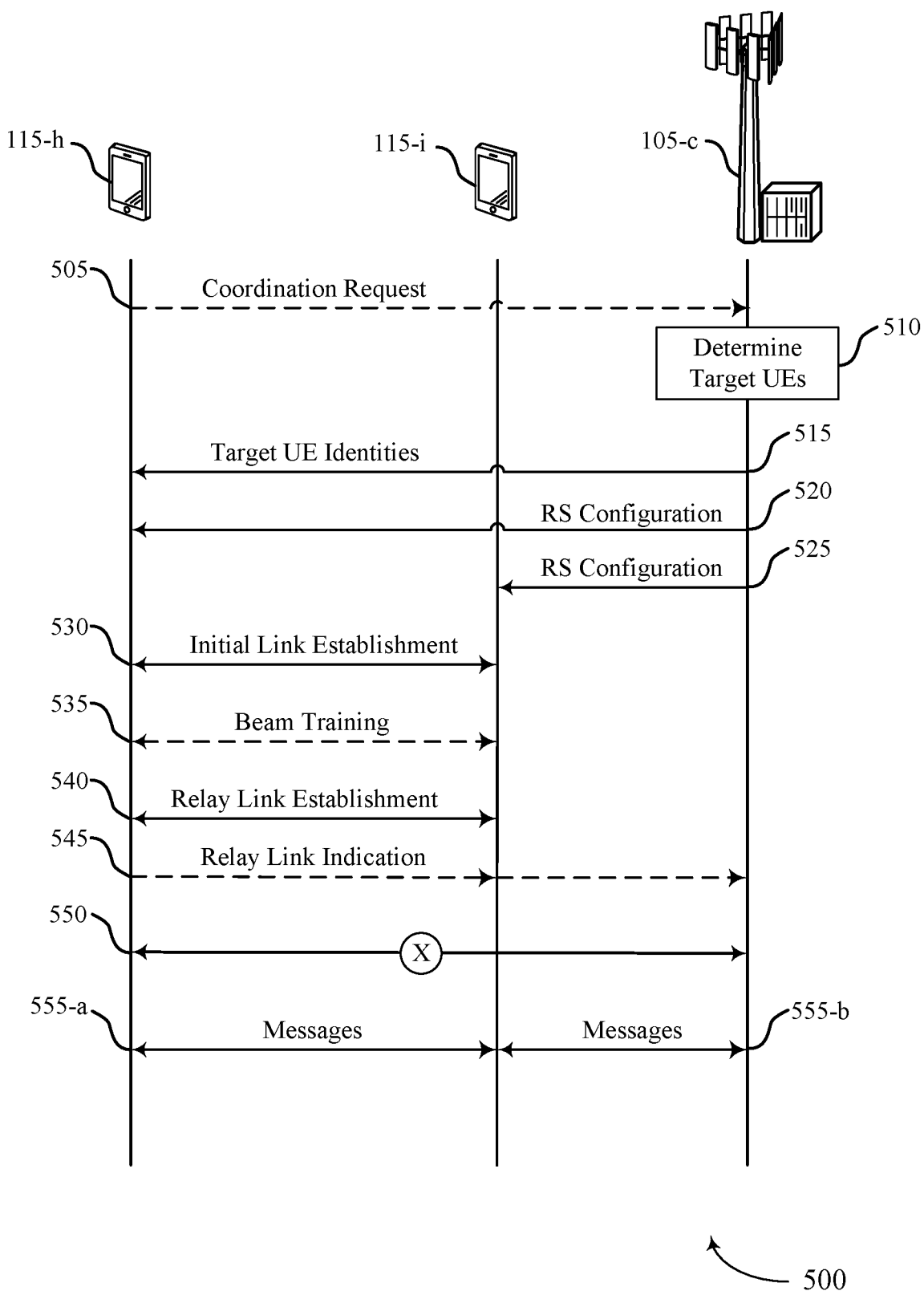
FIG. 5 illustrates an example of a process flow that supports establishment of millimeter wave relay links between UEs with base station coordination in accordance with aspects of the present disclosure.

FIG. 5 illustrates an example of a process flow 500 that supports establishment of millimeter wave relay links between UEs with base station coordination in accordance with aspects of the present disclosure. In some examples, the process flow 500 may implement aspects of wireless communication systems 100 or 200, the coordination procedures 300, or the periodic resource coordination procedure 400.

The process flow may include a first UE 115-h and a second UE 115-g, which may be examples of UEs 115 described with reference to FIGS. 1-4; and a base station 105-c, which may be an example of base stations 105 described with reference to FIGS. 1-4. The process flow 500 provides an example of communications that occur between the first UE 115-h, the second UE 115-i and the base station 105-c for setting up a relay link between the first UE 115-h and the second UE 115-i.

At 505, the first UE 115-h may send a coordination request over an established communication link, such as a mmW communication link to the base station 105-c for the base station 105-c to coordinate establishment of relay links between the first UE 115-h and other UEs served by the base station 105-c. In some cases, the coordination may be triggered by one or more events that effect the communication link between the first UE 115-h and the base station 105-c, such as Doppler fading, signal blocking, UE constraints (e.g., maximum permissible exposure, power limits, thermal metrics, etc.) as described herein. In some examples, the base station 105-c may detect one or more events and initiate coordination of relay links without receiving the coordination request from the first UE 115-h. In further examples, the base station 105-c may send an acknowledgement to the first UE 115-h that it has received the coordination request or that the base station 105-c is independently initiating a relay link procedure.

At 510, the base station 105-c may determine a set of UEs that are potential candidates for establishing a communication link with the first UE 115-h and are served by the base station 105-c. In some examples, the base station 105-c may determine UEs that can establish a mmW relay link with the first UE and already have an established mmW communication link with the base station 105-c. For example, the base station 105-c may identify the second UE 115-i as a candidate for performing a discovery process with the first UE 115-h.

At 515, the base station 105-c may transmit an identity of the second UE 115-i or other target UEs to the first UE 115-h, which may be used by the first UE 115-h to establish a relay connection with the second UE 115-i. In some cases, the identity may include a RNTI, TMSI, TIN or a combination thereof.

At 520, the base station 105-c may transmit a reference signal configuration to the first UE 115-h for the first UE 115-h to use during initial signaling or beam training communications with the second UE 115-i. In some cases, transmitting the reference signal configuration may indicate to the first UE 115-h to initiate a signaling discovery process with the second UE 115-i, as described herein. In further examples, the reference signal information may indicate whether the first UE 115-h is to act as a transmitter or a receiver during the link establishment procedures. In some cases, the base station 105-c may also provide directional beam information or timing offset information to the first UE 115-h to use in establishing the relay link as described herein.

At 525, the base station 105-c may transmit a reference signal configuration to the second UE 115-i for the second UE 115-i to use in during initial signaling or beam training communications with the first UE 115-h. The reference signal configuration may indicate to the second UE 115-i to initiate a signaling discovery process with the first UE 115-h and may indicate whether the second UE 115-i is to act as a transmitter or receiver during the link establishment procedures. For example, if the first UE 115-h is instructed to act as a transmitter then the second UE 115-i may be instructed to act as a receiver. In some cases, the base station 105-c may also provide directional beam information or timing offset information to the first UE 115-i to use in establishing the relay link as described herein.

At 530, the first UE 115-h and the second UE 115-i may perform an initial link establishment procedure. In cases where the first UE 115-h is instructed to be the transmitter, the first UE 115-h may use the reference signal configuration information to perform a transmitting beam sweep procedure, for example, using wide beams (e.g., omni or pseudo-omni beams) as described herein. In cases where the base station 105-c provided directional beam information or timing offset information, the first UE 115-h may perform the beam sweep procedure using narrow transmit beams. The second UE 115-i may use the reference signal information to perform a receive beam sweep procedure, for example, using wide beams. In cases where the base station 105-c provided directional beam information or timing offset information, the first UE 115 may perform the beam sweep procedure using narrow receive beams.

At 535, in cases where the base station did not provide directional beam information or timing offset information, the first UE 115-h and the second UE 115-i may use the initial link established using wide beams to perform a beam training procedure.

At 540, the first UE 115-h and the second UE 115-i may use the narrow beams to perform a RACH procedure. In some cases, the receiver UE (e.g., UE 115-i) may establish a link using a RACH resource that was allocated by the base station 105-c in coordination with the reference signal resources to the first UE 115-h and the second UE 115-i. The first UE 115-h and the second UE-i may establish a relay link based on performing the RACH procedure.

At 545, the first UE 115-h or the second UE 115-i may transmit an indication to the base station 105-c that they have established a relay link.

At 550, at communication link between the first UE 115-h and the base station 105-c may fail.

At 555, the first UE 115-h or the base station 105-c may determine that the relay link can be used to perform communications via the second UE 115-i, such as for beam failure recovery or other messaging between the UE 115-h and the base station 105-c. In some cases, at 555-a, the first UE 115-h may transmit a message to the second UE 115-i indicating that the message is intended for the base station 105-c. The second UE 115-i may identify that the message is intended for the base station 105-c, and at 555-b, transfer the message to the base station 105-c. The base station 105-c may transmit messages via the second UE 115-i by using a similar process.

Figure 6:
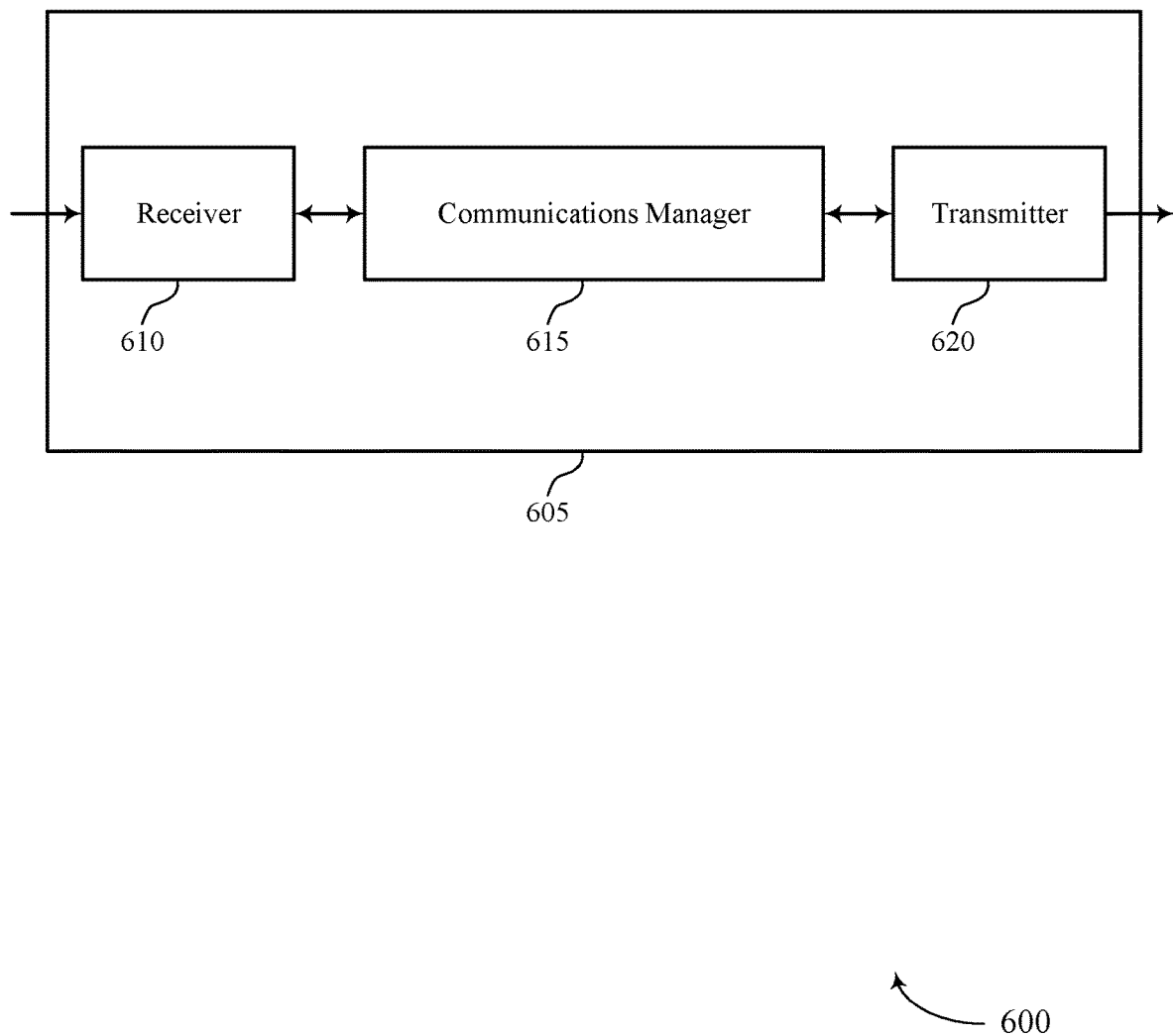
FIGS. 6 and 7 show block diagrams of devices that support establishment of millimeter wave relay links between UEs with base station coordination in accordance with aspects of the present disclosure.

FIG. 6 shows a block diagram 600 of a device 605 that supports establishment of millimeter wave relay links between UEs with base station coordination in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to establishment of millimeter wave relay links between UEs with base station coordination, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an identifier of a second UE, the base station serving both the first UE and the second UE, receive, from the base station, a reference signal configuration for establishing a relay link with the second UE, perform a relay link beam sweep procedure with the second UE based on the reference signal configuration and the identifier, and establish the relay link with the second UE based on the relay link beam sweep procedure. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615, as described herein may be implemented to realize one or more potential advantages. One implementation may allow a UE 115 to continue to communicate with a base station 105 via a second UE relay link even when a communications link between the UE 115 and the base station fails. In this regard, signaling overhead of performing a beam failure recovery may be reduced using the relay link. Additionally or alternatively, the UE may continue to receive messages from the base station using the relay link, which may reduce disruptions of services.

The transmitter 620 may transmit signals generated by other components of the device 605. In some examples, the transmitter 620 may be collocated with a receiver 610 in a transceiver. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to more efficiently coordinate relay link establishment, and more specifically to autonomously or semi-autonomously establish relay link with another device and using mmW/beamformed techniques. For example, the device 605 may receive a relay link beam sweep configuration from a base station and perform a beam sweep procedure to identify a beam configuration to use in the relay link.

Based on implementing the relay link techniques as described herein, a processor of a UE 115 (e.g., controlling the receiver 610, the transmitter 620, or the transceiver 920 as described with reference to FIG. 9) may increase reliability and decrease signaling overhead in the communication of feedback because the feedback configuration may not be explicitly indicated to the UE 115.

Figure 7:
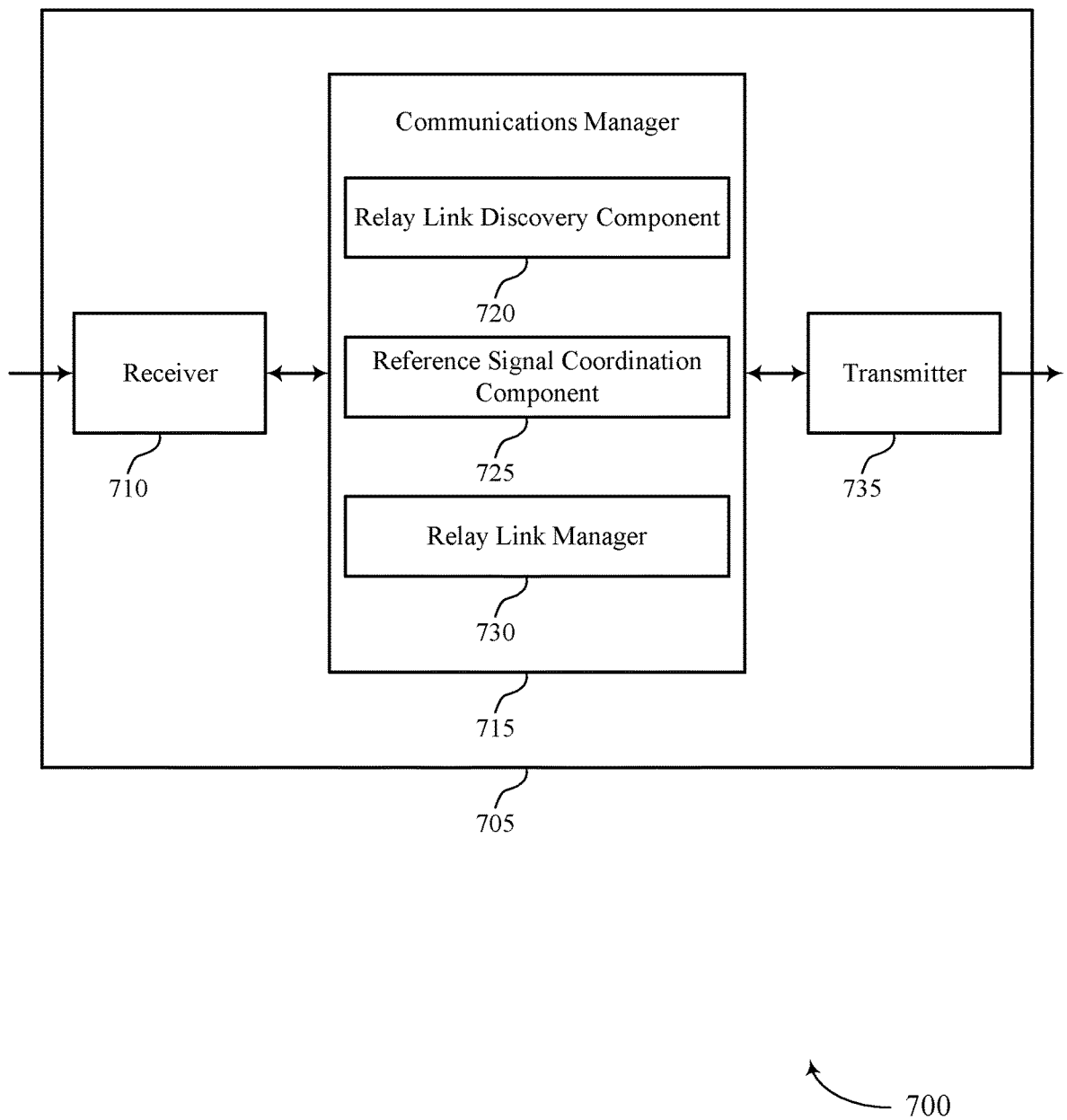

FIG. 7 shows a block diagram 700 of a device 705 that supports establishment of millimeter wave relay links between UEs with base station coordination in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to establishment of millimeter wave relay links between UEs with base station coordination, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a relay link discovery component 720, a reference signal coordination component 725, and a relay link manager 730. The communications manager 715 may be an example of aspects of the communications manager 910 described herein.

The relay link discovery component 720 may receive, from a base station, an identifier of a second UE, the base station serving both the first UE and the second UE.

The reference signal coordination component 725 may receive, from the base station, a reference signal configuration for establishing a relay link with the second UE and perform a relay link beam sweep procedure with the second UE based on the reference signal configuration and the identifier.

The relay link manager 730 may establish the relay link with the second UE based on the relay link beam sweep procedure.

The transmitter 735 may transmit signals generated by other components of the device 705. In some examples, the transmitter 735 may be collocated with a receiver 710 in a transceiver. For example, the transmitter 735 may be an example of aspects of the transceiver 920 described with reference to FIG. 9. The transmitter 735 may utilize a single antenna or a set of antennas.

Figure 8:
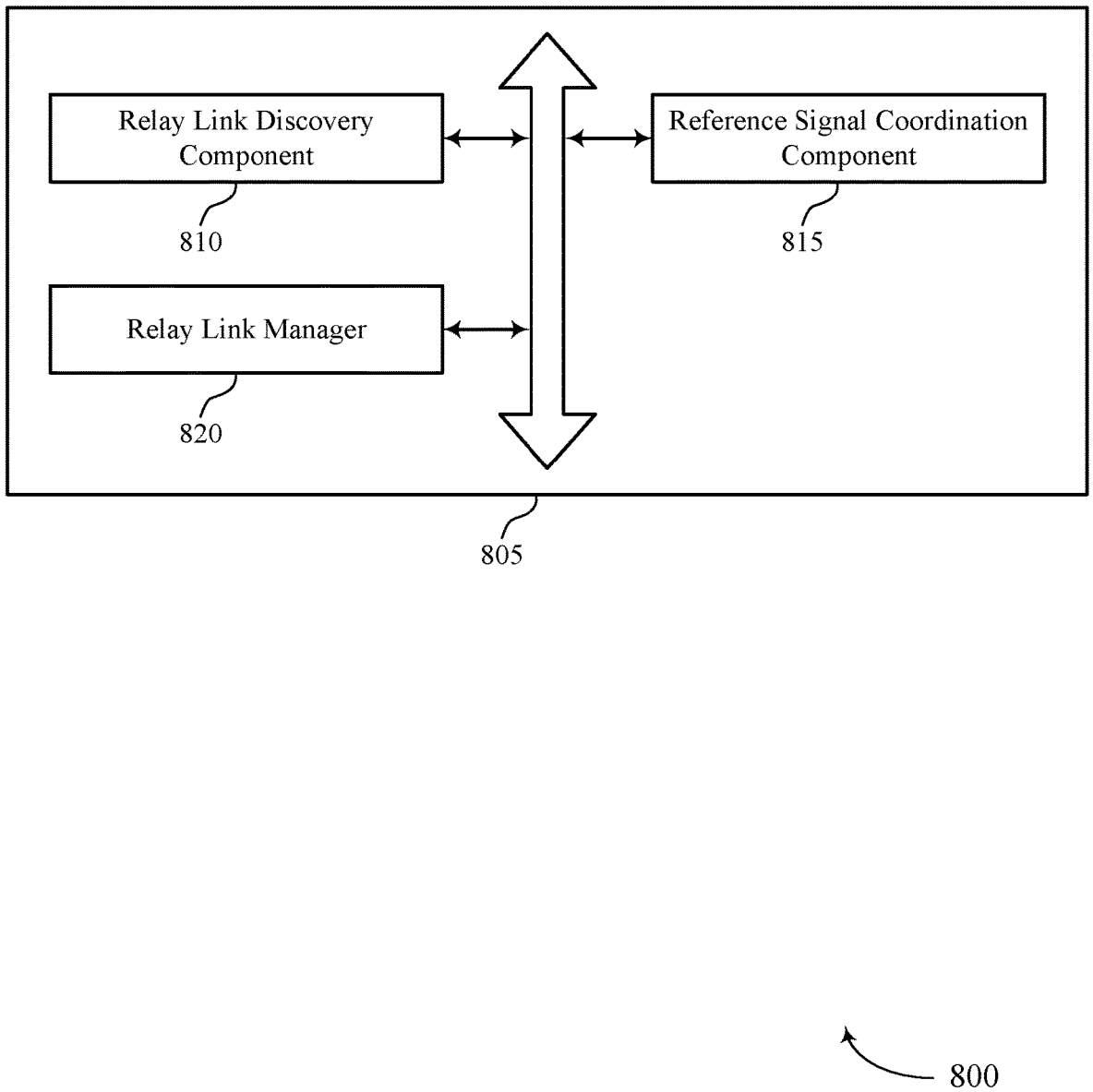
FIG. 8 shows a block diagram of a communications manager that supports establishment of millimeter wave relay links between UEs with base station coordination in accordance with aspects of the present disclosure.

FIG. 8 shows a block diagram 800 of a communications manager 805 that supports establishment of millimeter wave relay links between UEs with base station coordination in accordance with aspects of the present disclosure. The communications manager 805 may be an example of aspects of a communications manager 615, a communications manager 715, or a communications manager 910 described herein. The communications manager 805 may include a relay link discovery component 810, a reference signal coordination component 815, and a relay link manager 820. Each of these components may communicate, directly or indirectly, with one another (e.g., via one or more buses).

The relay link discovery component 810 may receive, from a base station, an identifier of a second UE, the base station serving both the first UE and the second UE. In some examples, the relay link discovery component 810 may receive, from the base station, a set of identifiers associated with a set of UEs. In some examples, the relay link discovery component 810 may select the second UE from the set of UEs based on the set of identifiers. In some examples, the relay link discovery component 810 may select a subset of second UEs from the set of UEs for simultaneous reception from the first UE and relay link establishment with the first UE. In some cases, the identifier includes one or more of a radio network temporary identifier, a temporary mobile subscriber identity, a temporary identity, or any combination thereof.

The reference signal coordination component 815 may receive, from the base station, a reference signal configuration for establishing a relay link with the second UE. In some examples, the reference signal coordination component 815 may perform a relay link beam sweep procedure with the second UE based on the reference signal configuration and the identifier. In some examples, the reference signal coordination component 815 may acknowledge reception of the reference signal configuration transmitted by the base station. In some examples, the reference signal coordination component 815 may transmit a coordination message that requests the base station to trigger the second UE to perform the relay link beam sweep procedure, where the reference signal configuration is received based on transmitting the coordination message.

In some examples, the reference signal coordination component 815 may detect one or more conditions associated with a communication link between the first UE and the base station, where the coordination message is transmitted based on the detecting. In some examples, the reference signal coordination component 815 may perform the relay link beam sweep procedure within a synchronization signal block resource using a set of beams to identify a beam pair, where the relay link is established with the second UE using the beam pair. In some examples, the reference signal coordination component 815 may perform the relay link beam sweep procedure using a set of wide or pseudo-omni beams.

In some examples, the reference signal coordination component 815 may establish an initial communications link with the second UE using a first beam from the set of wide or pseudo-wide beams. In some examples, the reference signal coordination component 815 may identify the first beam from a set of wide beams based on a reference signal received power (RSRP), reference signal received quality (RSRQ), SNR, signal-to-interference and noise ratio (SINR), a received signal strength indicator (RSSI) metric or a combination thereof. In some examples, the reference signal coordination component 815 may identify a plurality of additional reference signal configurations, based on establishing the initial communications link, for a relay link beam training procedure with the second UE to identify a narrow beam from a set of narrow beams based on at least one of the plurality of additional reference signal configurations. In some examples, the reference signal coordination component 815 may receive one or more of directional beam information or timing offset information from the base station, where the relay link beam sweep procedure is performed using the directional beam information, the timing offset information, or both.

In some examples, the reference signal coordination component 815 may receive one or more of a downlink reference signal configuration or an uplink reference signal configuration.

In some cases, the directional beam information is based on relative positions of the first UE and the second UE, prior beam pair reports from the first UE and the second UE to the base station, UE antenna configuration or capability information of the first UE and the second UE, an estimate at the base station of channel state information between the first UE and the second UE, or a combination thereof.

In some cases, the reference signal configuration is triggered based on one or more of a power metric, a thermal metric, a permissible exposure limit, a link budget, a blockage condition, or a channel environment condition.

The relay link manager 820 may establish the relay link with the second UE based on the relay link beam sweep procedure. In some examples, the relay link manager 820 may perform the relay link beam training procedure with the second UE to identify the narrow beam from the set of narrow beams based on at least one of the plurality of additional reference signal configurations. In some examples, the relay link manager 820 may transmit or receiving an indication of the narrow beam, where the relay link is established using the narrow beam. In some examples, the relay link manager 820 may perform a random access channel procedure with the second UE using a random access channel resource to establish the relay link using a beam identified in the relay link beam sweep procedure. In some examples, the relay link manager 820 may receive from the base station an indication of the random access channel resource. In some examples, the relay link manager 820 may receive data from the base station via the second UE and the relay link based on establishing the relay link with the second UE. In some examples, the relay link manager 820 may transmit data to the base station via the second UE and the relay link based on establishing the relay link with the second UE.

Figure 9:
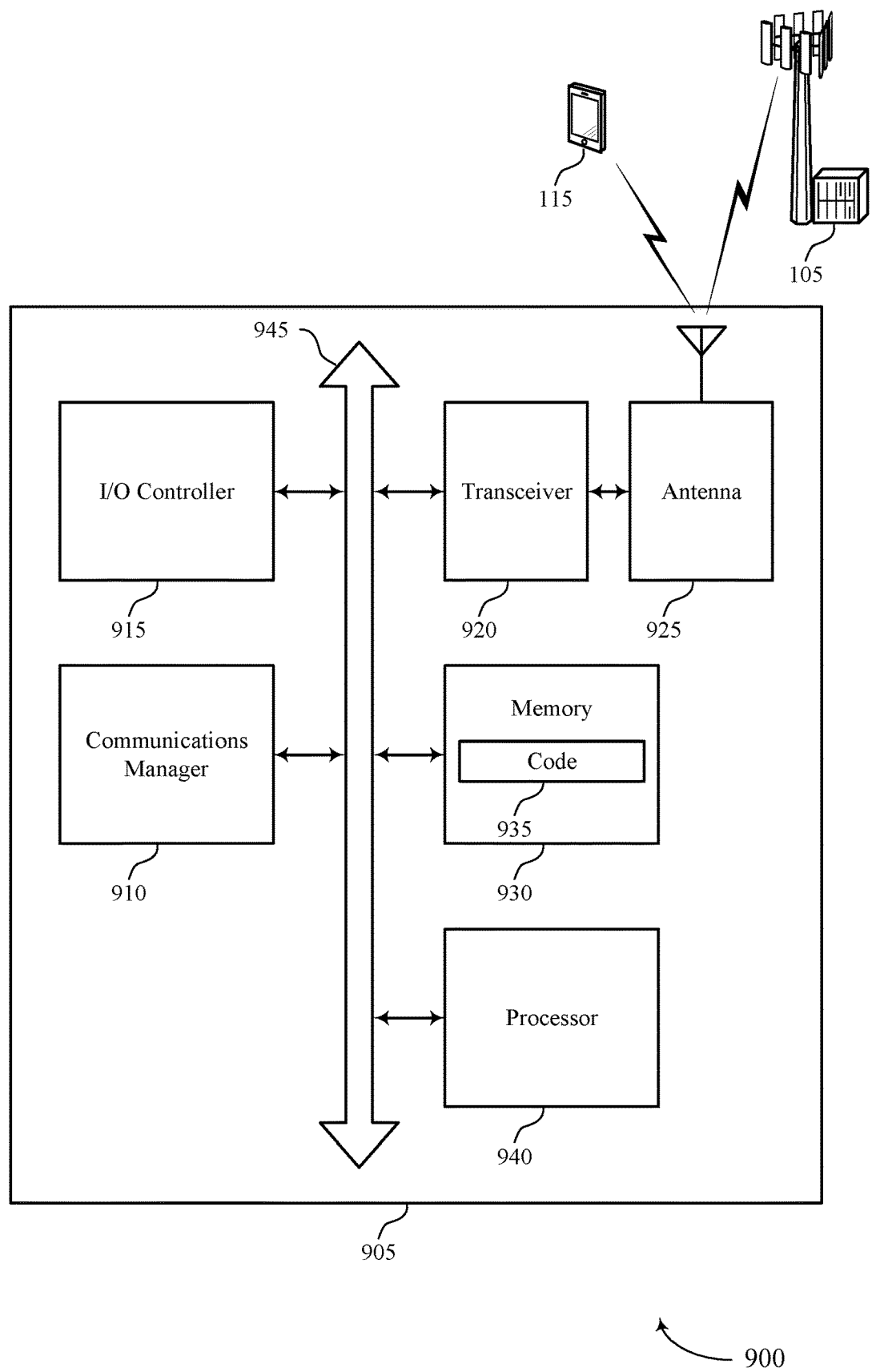
FIG. 9 shows a diagram of a system including a device that supports establishment of millimeter wave relay links between UEs with base station coordination in accordance with aspects of the present disclosure.

FIG. 9 shows a diagram of a system 900 including a device 905 that supports establishment of millimeter wave relay links between UEs with base station coordination in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an identifier of a second UE, the base station serving both the first UE and the second UE, receive, from the base station, a reference signal configuration for establishing a relay link with the second UE, perform a relay link beam sweep procedure with the second UE based on the reference signal configuration and the identifier, and establish the relay link with the second UE based on the relay link beam sweep procedure.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting establishment of millimeter wave relay links between UEs with base station coordination).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Based on establishing a relay link with the second UE, for example, using a relay link beam sweep procedure, a processor of a first UE (e.g., controlling the receiver 710, the transmitter 735, or the transceiver 920 as described with reference to FIGS. 7 and 9) may maintain communications with a base station in the event of a communication link failure by transmitting or receiving communications via a relay link established with a second UE. As such, when a communication link between a first UE and the base station fails, the processor may continue to direct communications with the base station using the relay link established with the second UE, which may allow a more efficient beam failure recovery or continued service for the first UE.

Figure 10:
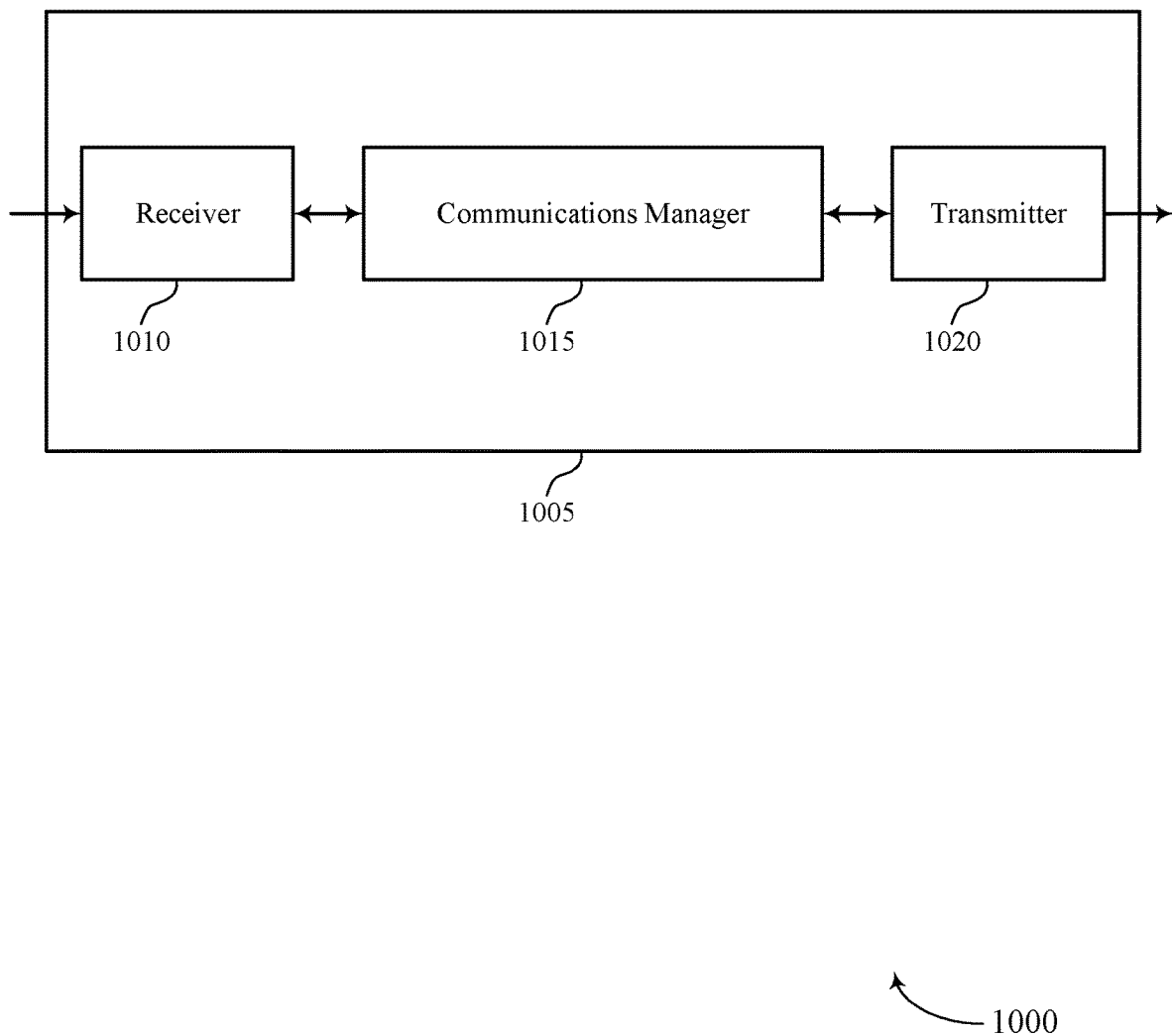
FIGS. 10 and 11 show block diagrams of devices that support establishment of millimeter wave relay links between UEs with base station coordination in accordance with aspects of the present disclosure.

FIG. 10 shows a block diagram 1000 of a device 1005 that supports establishment of millimeter wave relay links between UEs with base station coordination in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to establishment of millimeter wave relay links between UEs with base station coordination, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a first UE, an identifier of a second UE, transmit, to the first UE and the second UE, a reference signal configuration for performing a relay link beam sweep procedure for establishing a relay link between the first UE and the second UE, and receive an indication, from at least one of the first UE or the second UE, that the relay link has been established between the first UE and the second UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver. For example, the transmitter 1020 may be an example of aspects of the transceiver 1320 described with reference to FIG. 13. The transmitter 1020 may utilize a single antenna or a set of antennas.

Figure 11:
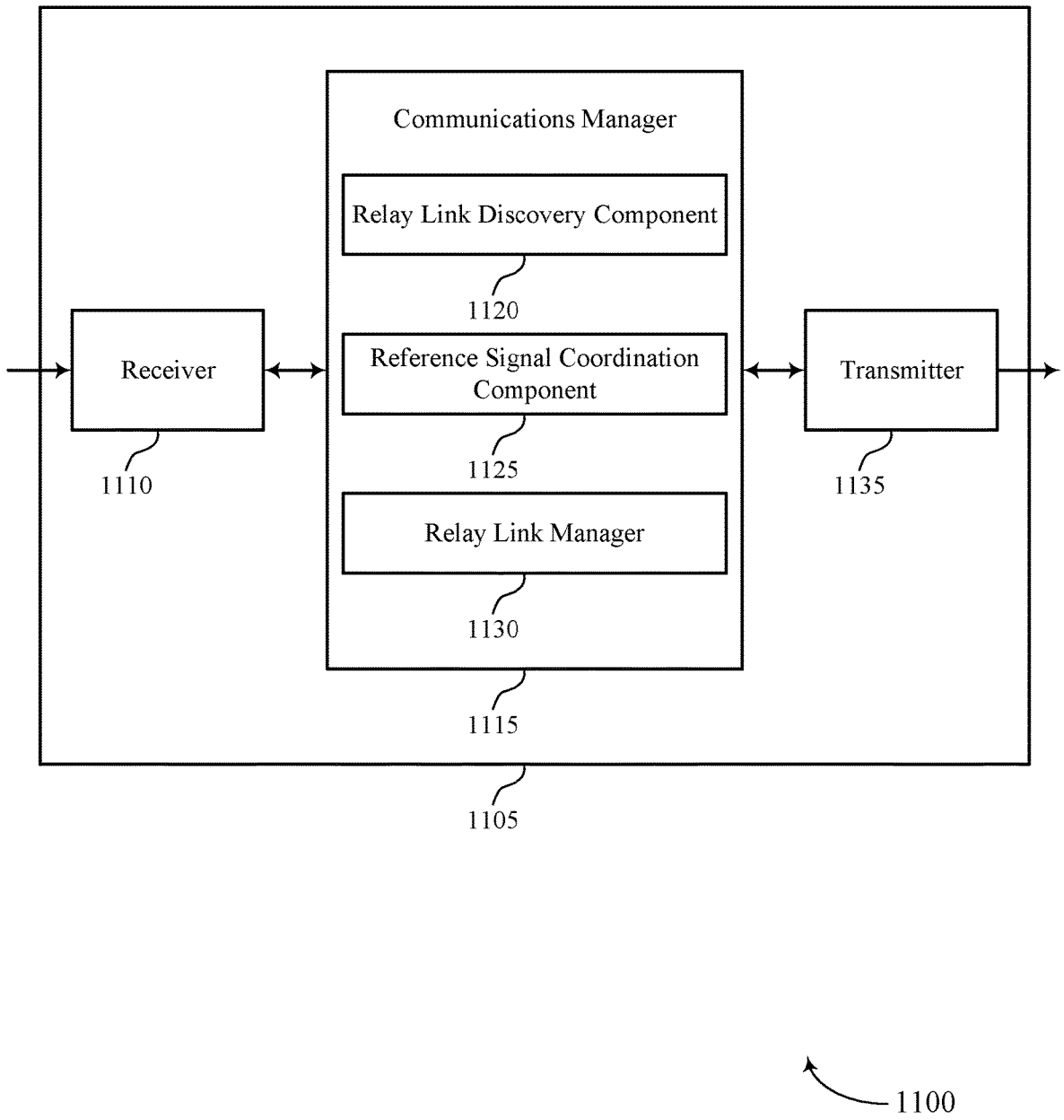

FIG. 11 shows a block diagram 1100 of a device 1105 that supports establishment of millimeter wave relay links between UEs with base station coordination in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to establishment of millimeter wave relay links between UEs with base station coordination, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a relay link discovery component 1120, a reference signal coordination component 1125, and a relay link manager 1130. The communications manager 1115 may be an example of aspects of the communications manager 1310 described herein.

The relay link discovery component 1120 may transmit, to a first UE, an identifier of a second UE.

The reference signal coordination component 1125 may transmit, to the first UE and the second UE, a reference signal configuration for performing a relay link beam sweep procedure for establishing a relay link between the first UE and the second UE.

The relay link manager 1130 may receive an indication, from at least one of the first UE or the second UE, that the relay link has been established between the first UE and the second UE.

The transmitter 1135 may transmit signals generated by other components of the device 1105. In some examples, the transmitter 1135 may be collocated with a receiver 1110 in a transceiver. For example, the transmitter 1135 may be an example of aspects of the transceiver 1320 described with reference to FIG. 13. The transmitter 1135 may utilize a single antenna or a set of antennas.

Figure 12:
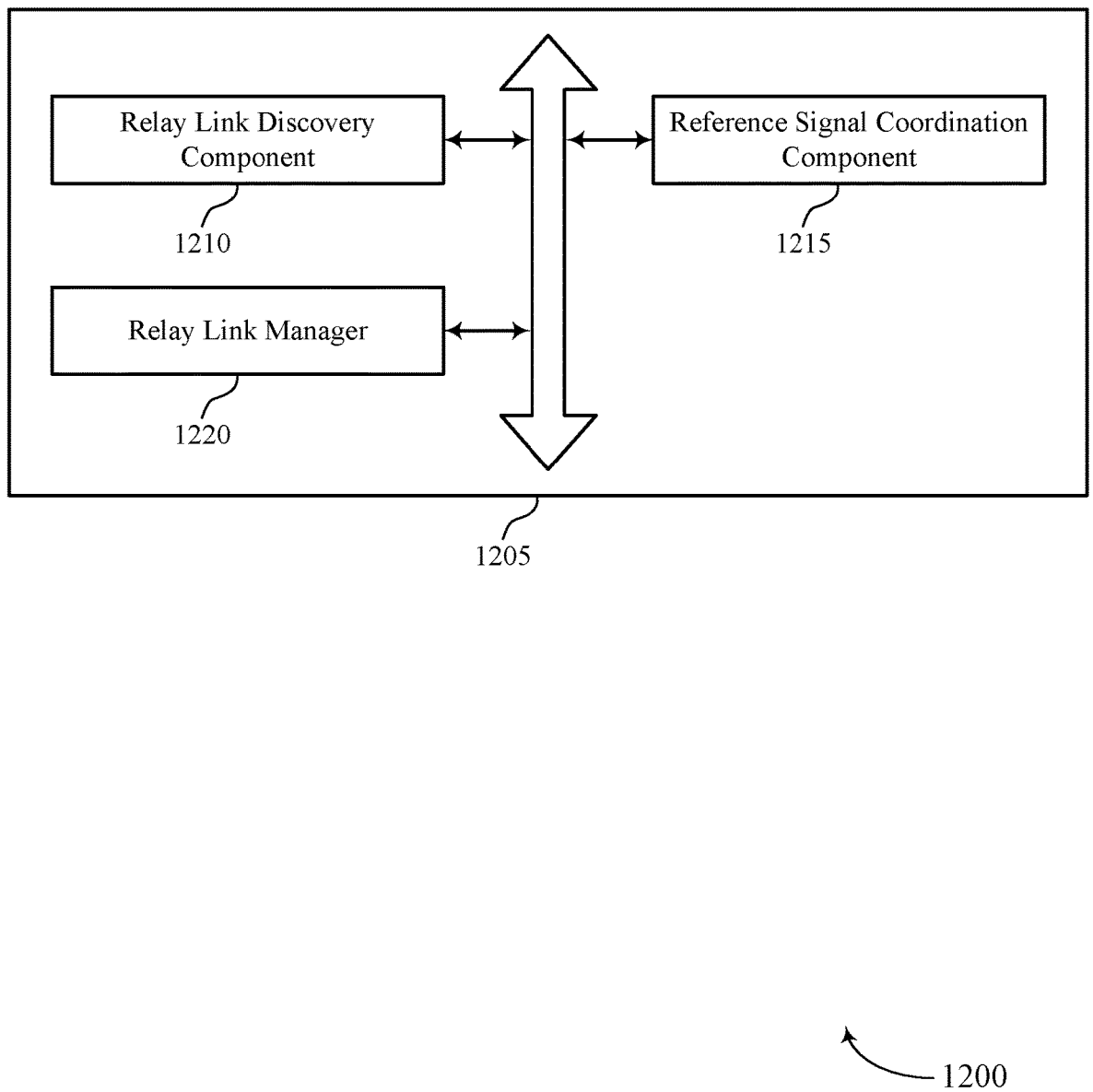
FIG. 12 shows a block diagram of a communications manager that supports establishment of millimeter wave relay links between UEs with base station coordination in accordance with aspects of the present disclosure.

FIG. 12 shows a block diagram 1200 of a communications manager 1205 that supports establishment of millimeter wave relay links between UEs with base station coordination in accordance with aspects of the present disclosure. The communications manager 1205 may be an example of aspects of a communications manager 1015, a communications manager 1115, or a communications manager 1310 described herein. The communications manager 1205 may include a relay link discovery component 1210, a reference signal coordination component 1215, and a relay link manager 1220. Each of these components may communicate, directly or indirectly, with one another (e.g., via one or more buses).

The relay link discovery component 1210 may transmit, to a first UE, an identifier of a second UE. In some examples, the relay link discovery component 1210 may determine a relative location between the first UE and the second UE based on a location estimation signal. In some examples, the relay link discovery component 1210 may select the second UE as a candidate for establishing the relay link with the first UE based on the relative location. In some examples, the relay link discovery component 1210 may determine a set of UEs including the second UE that are candidates for establishing the relay link with the first UE based on relative locations between the set of UEs and the first UE. In some examples, the relay link discovery component 1210 may transmit, to the first UE, identifiers of the set of UEs. In some examples, the relay link discovery component 1210 may detect a metric associated with a communication link between the base station and the first UE. In some examples, the relay link discovery component 1210 may transmit the identifier of the second UE to the first UE based on detecting the metric.

In some cases, the metric includes one or more of a signal quality measurement, a sensor measurement, a power measurement, a maximum permissible exposure metric, a link budget, or a channel sensing metric.

In some cases, the identifier includes one or more of a radio network temporary identifier, a temporary mobile subscriber identity, or a temporary identity.

The reference signal coordination component 1215 may transmit, to the first UE and the second UE, a reference signal configuration for performing a relay link beam sweep procedure for establishing a relay link between the first UE and the second UE. In some examples, the reference signal coordination component 1215 may receive an acknowledgment from at least one of the first and the second UE of the reception of the reference signal configuration. In some examples, the reference signal coordination component 1215 may transmit one of a downlink reference signal configuration or an uplink reference signal configuration, information to the first UE. In some examples, the reference signal coordination component 1215 may transmit the other of the downlink reference signal configuration or the uplink reference signal configuration to the second UE.

In some examples, the reference signal coordination component 1215 may transmit, to the first UE and the second UE, directional beam information for the first UE, the second UE, or both. In some examples, the reference signal coordination component 1215 may transmit, to the first UE and the second UE, timing offset information for the first UE, the second UE, or both. In some examples, the reference signal coordination component 1215 may receive a coordination message that requests the base station to trigger a relay link beam sweep procedure with another UE, where the reference signal configuration is transmitted based on receiving the coordination message. In some examples, the reference signal coordination component 1215 may transmit an indication of a random access resource to the first UE, the second UE, or both.

In some cases, the reference signal configuration indicates a synchronization signal block resource in which to perform a relay link beam sweep procedure.

In some cases, the reference signal configuration is based on one or more of a power metric, a thermal metric, a maximum permissible exposure limit, a link budget, or a channel environment condition.

The relay link manager 1220 may receive an indication, from at least one of the first UE or the second UE, that the relay link has been established between the first UE and the second UE. In some examples, the relay link manager 1220 may identify data to be transmitted to the first UE. In some examples, the relay link manager 1220 may transmit the data to the second UE with instructions to forward to the data to the first UE via the relay link.

Figure 13:
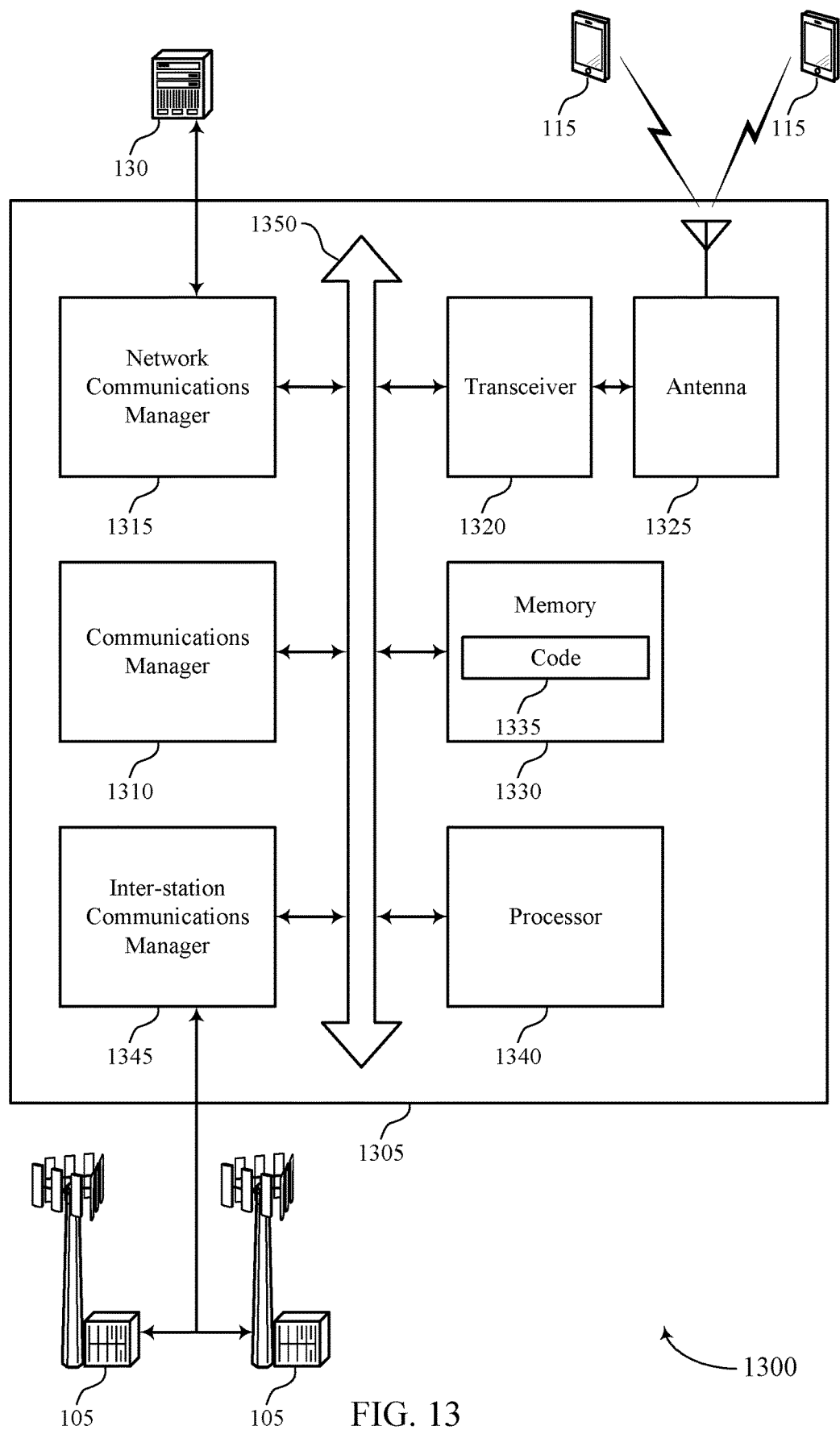
FIG. 13 shows a diagram of a system including a device that supports establishment of millimeter wave relay links between UEs with base station coordination in accordance with aspects of the present disclosure.

FIG. 13 shows a diagram of a system 1300 including a device 1305 that supports establishment of millimeter wave relay links between UEs with base station coordination in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a first UE, an identifier of a second UE, transmit, to the first UE and the second UE, a reference signal configuration for performing a relay link beam sweep procedure for establishing a relay link between the first UE and the second UE, and receive an indication, from at least one of the first UE or the second UE, that the relay link has been established between the first UE and the second UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting establishment of millimeter wave relay links between UEs with base station coordination).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
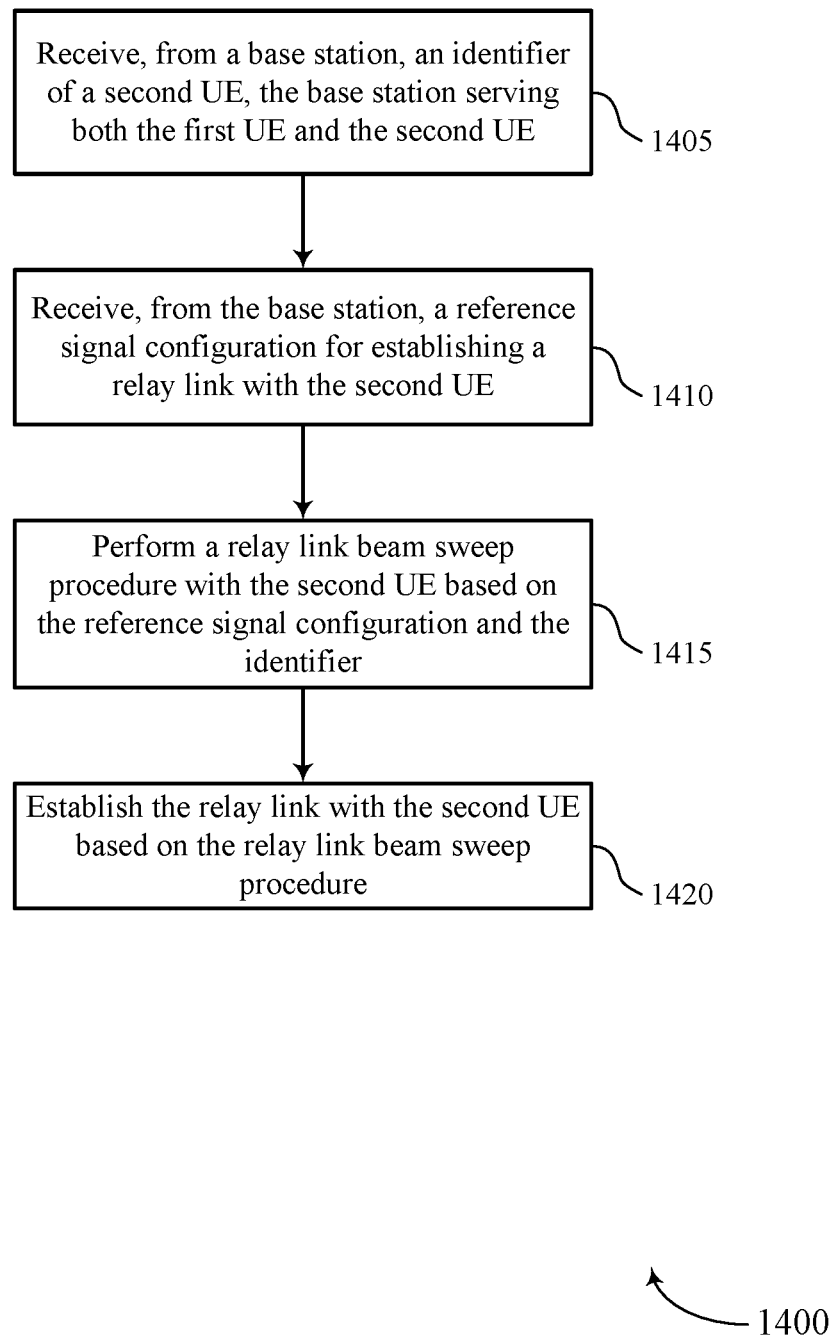
FIGS. 14 through 17 show flowcharts illustrating methods that support establishment of millimeter wave relay links between UEs with base station coordination in accordance with aspects of the present disclosure.

FIG. 14 shows a flowchart illustrating a method 1400 that supports establishment of millimeter wave relay links between UEs with base station coordination in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, an identifier of a second UE, the base station serving both the first UE and the second UE. The operations of 1405 may be performed according to the methods described herein. In some examples, aspects of the operations of 1405 may be performed by a relay link discovery component as described with reference to FIGS. 6 through 9.

At 1410, the UE may receive, from the base station, a reference signal configuration for establishing a relay link with the second UE. The operations of 1410 may be performed according to the methods described herein. In some examples, aspects of the operations of 1410 may be performed by a reference signal coordination component as described with reference to FIGS. 6 through 9.

At 1415, the UE may perform a relay link beam sweep procedure with the second UE based on the reference signal configuration and the identifier. The operations of 1415 may be performed according to the methods described herein. In some examples, aspects of the operations of 1415 may be performed by a reference signal coordination component as described with reference to FIGS. 6 through 9.

At 1420, the UE may establish the relay link with the second UE based on the relay link beam sweep procedure. The operations of 1420 may be performed according to the methods described herein. In some examples, aspects of the operations of 1420 may be performed by a relay link manager as described with reference to FIGS. 6 through 9.

Figure 15:
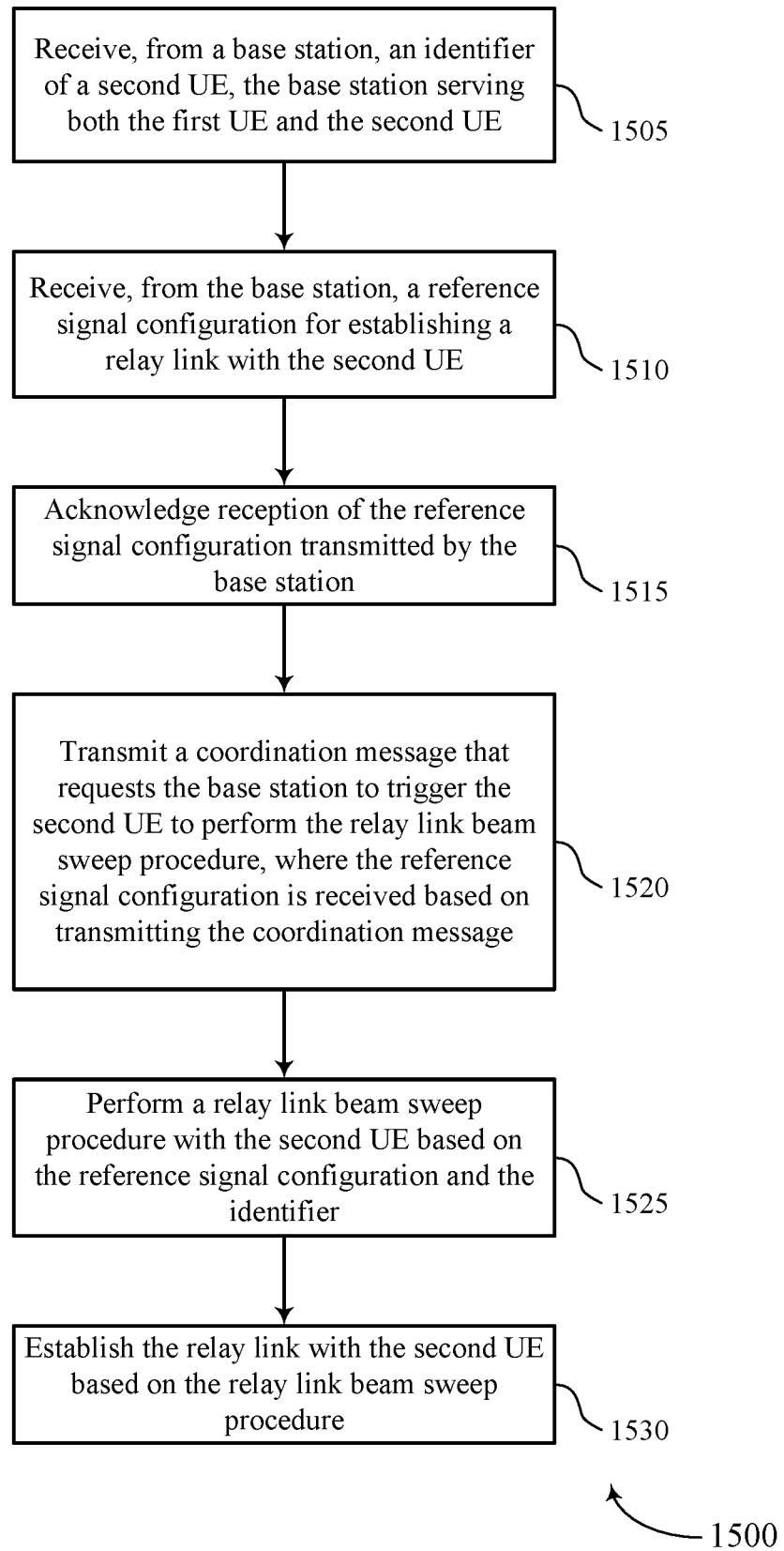

FIG. 15 shows a flowchart illustrating a method 1500 that supports establishment of millimeter wave relay links between UEs with base station coordination in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an identifier of a second UE, the base station serving both the first UE and the second UE. The operations of 1505 may be performed according to the methods described herein. In some examples, aspects of the operations of 1505 may be performed by a relay link discovery component as described with reference to FIGS. 6 through 9.

At 1510, the UE may receive, from the base station, a reference signal configuration for establishing a relay link with the second UE. The operations of 1510 may be performed according to the methods described herein. In some examples, aspects of the operations of 1510 may be performed by a reference signal coordination component as described with reference to FIGS. 6 through 9.

At 1515, the UE may acknowledge reception of the reference signal configuration transmitted by the base station. The operations of 1515 may be performed according to the methods described herein. In some examples, aspects of the operations of 1515 may be performed by a reference signal coordination component as described with reference to FIGS. 6 through 9.

At 1520, the UE may transmit a coordination message that requests the base station to trigger the second UE to perform the relay link beam sweep procedure, where the reference signal configuration is received based on transmitting the coordination message. The operations of 1520 may be performed according to the methods described herein. In some examples, aspects of the operations of 1520 may be performed by a reference signal coordination component as described with reference to FIGS. 6 through 9.

At 1525, the UE may perform a relay link beam sweep procedure with the second UE based on the reference signal configuration and the identifier. The operations of 1525 may be performed according to the methods described herein. In some examples, aspects of the operations of 1525 may be performed by a reference signal coordination component as described with reference to FIGS. 6 through 9.

At 1530, the UE may establish the relay link with the second UE based on the relay link beam sweep procedure. The operations of 1530 may be performed according to the methods described herein. In some examples, aspects of the operations of 1530 may be performed by a relay link manager as described with reference to FIGS. 6 through 9.

Figure 16:
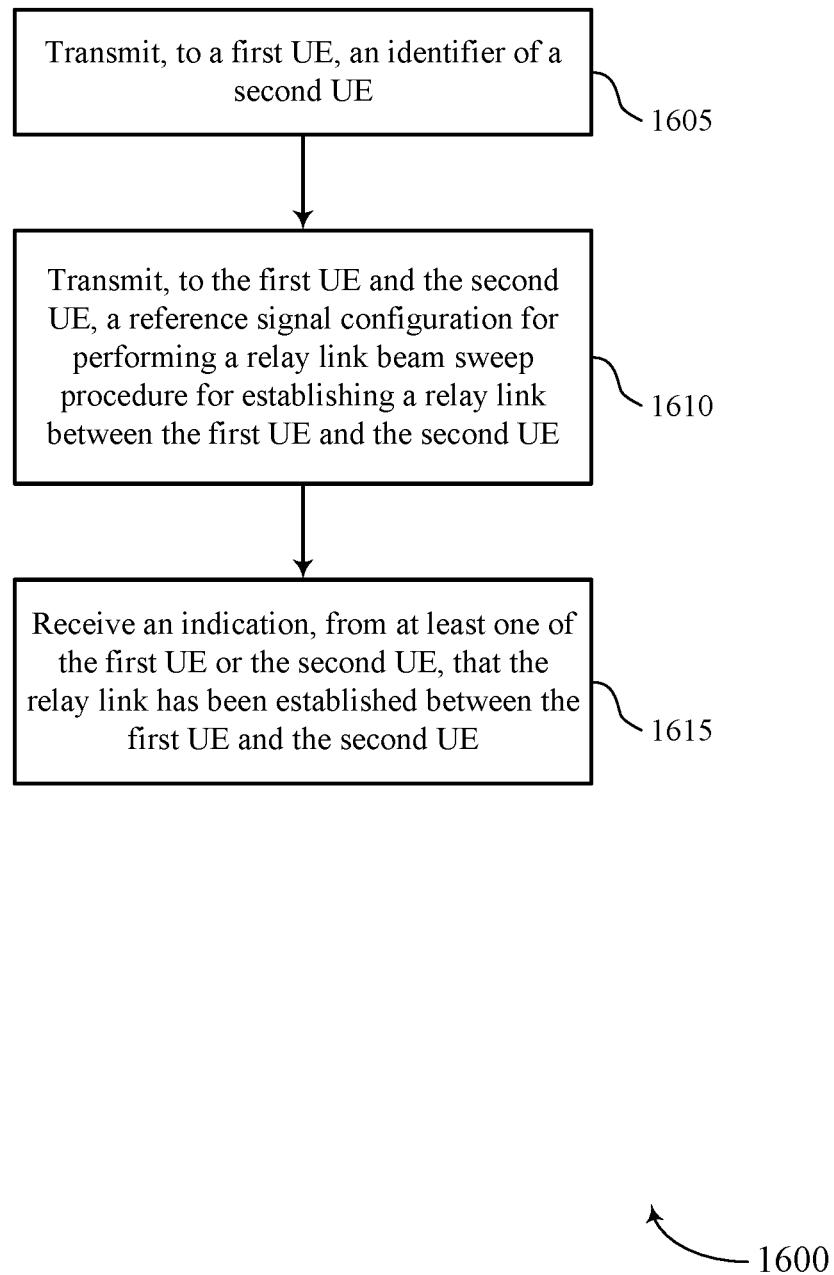

FIG. 16 shows a flowchart illustrating a method 1600 that supports establishment of millimeter wave relay links between UEs with base station coordination in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a first UE, an identifier of a second UE. The operations of 1605 may be performed according to the methods described herein. In some examples, aspects of the operations of 1605 may be performed by a relay link discovery component as described with reference to FIGS. 10 through 13.

At 1610, the base station may transmit, to the first UE and the second UE, a reference signal configuration for performing a relay link beam sweep procedure for establishing a relay link between the first UE and the second UE. The operations of 1610 may be performed according to the methods described herein. In some examples, aspects of the operations of 1610 may be performed by a reference signal coordination component as described with reference to FIGS. 10 through 13.

At 1615, the base station may receive an indication, from at least one of the first UE or the second UE, that the relay link has been established between the first UE and the second UE. The operations of 1615 may be performed according to the methods described herein. In some examples, aspects of the operations of 1615 may be performed by a relay link manager as described with reference to FIGS. 10 through 13.

Figure 17:
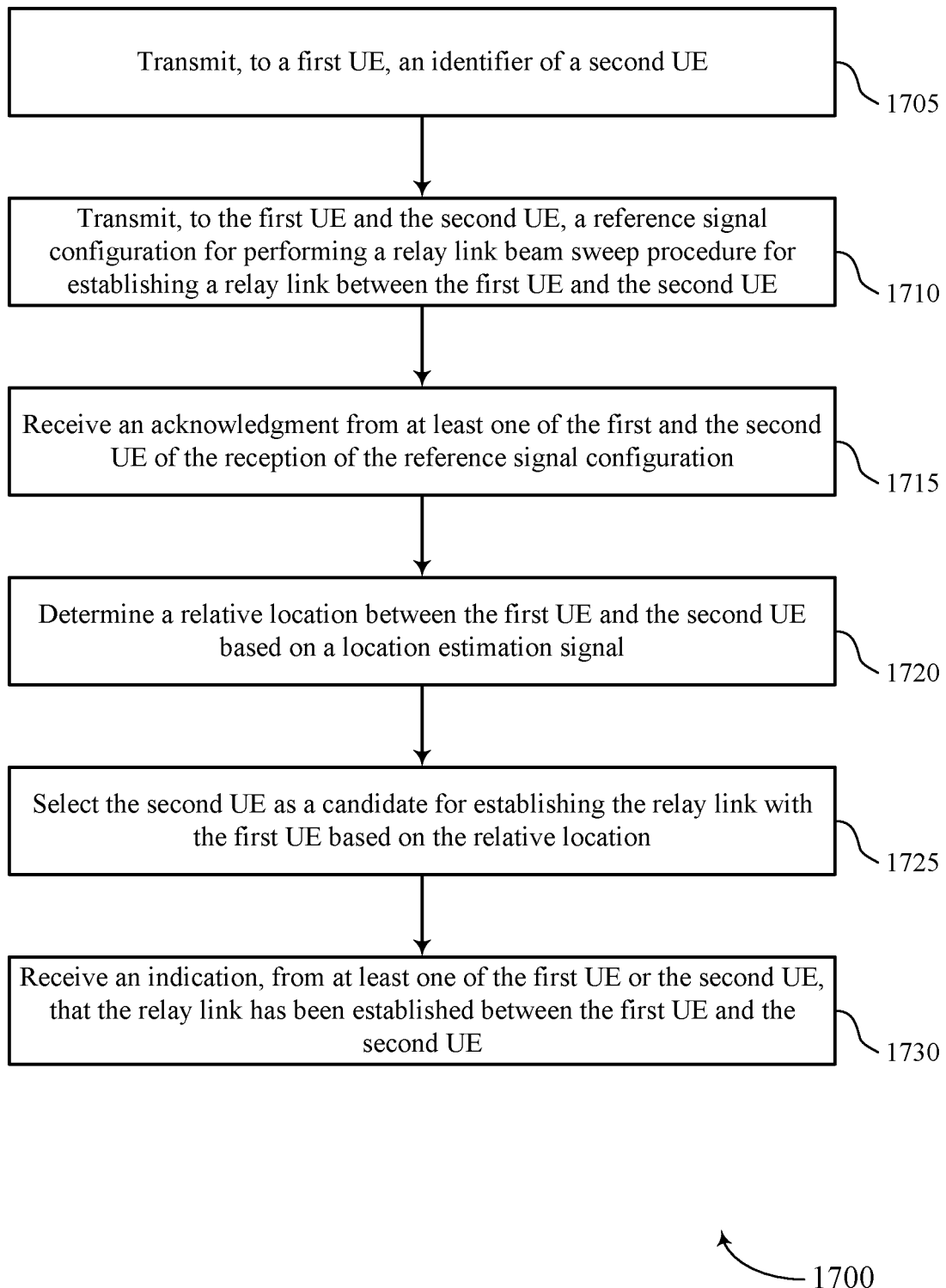

FIG. 17 shows a flowchart illustrating a method 1700 that supports establishment of millimeter wave relay links between UEs with base station coordination in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions herein below using special-purpose hardware.

At 1705, the base station may transmit, to a first UE, an identifier of a second UE. The operations of 1705 may be performed according to the methods described herein. In some examples, aspects of the operations of 1705 may be performed by a relay link discovery component as described with reference to FIGS. 10 through 13.

At 1710, the base station may transmit, to the first UE and the second UE, a reference signal configuration for performing a relay link beam sweep procedure for establishing a relay link between the first UE and the second UE. The operations of 1710 may be performed according to the methods described herein. In some examples, aspects of the operations of 1710 may be performed by a reference signal coordination component as described with reference to FIGS. 10 through 13.

At 1715, the base station may receive an acknowledgment from at least one of the first and the second UE of the reception of the reference signal configuration. The operations of 1715 may be performed according to the methods described herein. In some examples, aspects of the operations of 1715 may be performed by a reference signal coordination component as described with reference to FIGS. 10 through 13.

At 1720, the base station may determine a relative location between the first UE and the second UE based on a location estimation signal. The operations of 1720 may be performed according to the methods described herein. In some examples, aspects of the operations of 1720 may be performed by a relay link discovery component as described with reference to FIGS. 10 through 13.

At 1725, the base station may select the second UE as a candidate for establishing the relay link with the first UE based on the relative location. The operations of 1725 may be performed according to the methods described herein. In some examples, aspects of the operations of 1725 may be performed by a relay link discovery component as described with reference to FIGS. 10 through 13.

At 1730, the base station may receive an indication, from at least one of the first UE or the second UE, that the relay link has been established between the first UE and the second UE. The operations of 1730 may be performed according to the methods described herein. In some examples, aspects of the operations of 1730 may be performed by a relay link manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving, from a network device, an identifier of a second UE, the network device serving both the first UE and the second UE;
   receiving, from the network device, a reference signal configuration for establishing a relay link with the second UE, wherein the reference signal configuration indicates that the first UE is to transmit using a first plurality of beams during a relay link beam sweep procedure, receive using a second plurality of beams during the relay link beam sweep procedure, or both;
   performing the relay link beam sweep procedure with the second UE based at least in part on the reference signal configuration and the identifier; and
   establishing the relay link with the second UE based at least in part on the relay link beam sweep procedure.

2. The method of claim 1, further comprising:
   acknowledging reception of the reference signal configuration transmitted by the network device.

3. The method of claim 1, further comprising:
   transmitting a coordination message that requests the network device to trigger the second UE to perform the relay link beam sweep procedure, wherein the reference signal configuration is received based at least in part on transmitting the coordination message.

4. The method of claim 3, further comprising:
   detecting one or more conditions associated with a communication link between the first UE and the network device, wherein the coordination message is transmitted based at least in part on the detecting.

5. The method of claim 1, wherein performing the relay link beam sweep procedure further comprises:
   performing the relay link beam sweep procedure within a synchronization signal block resource using a set of beams to identify a beam pair, wherein the relay link is established with the second UE using the beam pair.

6. The method of claim 1, wherein performing the relay link beam sweep procedure further comprises:
   performing the relay link beam sweep procedure using a plurality of wide or pseudo-omni beams;
   establishing an initial communications link with the second UE using a first beam from the plurality of wide or pseudo-omni beams; and
   identifying the first beam from the plurality of wide or pseudo-omni beams based at least in part on a reference signal received power (RSRP), reference signal received quality (RSRQ), signal-to-noise ratio (SNR), signal-to-interference and noise ratio (SINR), a received signal strength indicator (RSSI) metric or a combination thereof.

7. The method of claim 6, further comprising:
   identifying a plurality of additional reference signal configurations, based at least in part on establishing the initial communications link, for a relay link beam training procedure with the second UE to identify a narrow beam from a plurality of narrow beams; and
   performing the relay link beam training procedure with the second UE to identify the narrow beam from the plurality of narrow beams based at least in part on at least one of the plurality of additional reference signal configurations.

8. The method of claim 7, further comprising:
   transmitting or receiving an indication of the narrow beam, wherein the relay link is established using the narrow beam.

9. The method of claim 1, wherein establishing the relay link comprises:
   performing a random access channel procedure with the second UE using a random access channel resource to establish the relay link using a beam identified in the relay link beam sweep procedure.

10. The method of claim 9, further comprising:
receiving from the network device an indication of the random access channel resource.

11. The method of claim 1, further comprising:
receiving, from the network device, a plurality of identifiers associated with a plurality of UEs;
selecting the second UE from the plurality of UEs based at least in part on the plurality of identifiers; and
selecting a subset of second UEs from the plurality of UEs for simultaneous reception from the first UE and relay link establishment with the first UE.

12. The method of claim 1, further comprising:
receiving one or more of directional beam information or timing offset information from the network device, wherein the relay link beam sweep procedure is performed using the directional beam information, the timing offset information, or both.

13. The method of claim 12, wherein the directional beam information is based at least in part on relative positions of the first UE and the second UE, prior beam pair reports from the first UE and the second UE to the network device, UE antenna configuration or capability information of the first UE and the second UE, an estimate at the network device of channel state information between the first UE and the second UE, or a combination thereof.

14. The method of claim 1, wherein receiving the reference signal configuration comprises:
receiving one or more of a downlink reference signal configuration or an uplink reference signal configuration.

15. The method of claim 1, further comprising:
receiving data from the network device via the second UE and the relay link based at least in part on establishing the relay link with the second UE.

16. The method of claim 1, further comprising:
transmitting data to the network device via the second UE and the relay link based at least in part on establishing the relay link with the second UE.

17. The method of claim 1, wherein the identifier comprises one or more of a radio network temporary identifier, a temporary mobile subscriber identity, a temporary identity, or any combination thereof.

18. A method for wireless communication at a network device, comprising:
transmitting, to a first user equipment (UE), an identifier of a second UE;
transmitting, to the first UE and the second UE, a reference signal configuration for performing a relay link beam sweep procedure for establishing a relay link between the first UE and the second UE, wherein the reference signal configuration indicates that the first UE is to transmit using a first plurality of beams during the relay link beam sweep procedure, receive using a second plurality of beams during the relay link beam sweep procedure, or both; and
receiving an indication, from at least one of the first UE or the second UE, that the relay link has been established between the first UE and the second UE.

19. The method of claim 18, further comprising:
receiving an acknowledgment from at least one of the first UE and the second UE of reception of the reference signal configuration.

20. The method of claim 18, further comprising:
determining a relative location between the first UE and the second UE based at least in part on a location estimation signal;
determining a plurality of UEs including the second UE that are candidates for establishing the relay link with the first UE based at least in part on relative locations between the plurality of UEs and the first UE;
selecting the second UE as a candidate for establishing the relay link with the first UE based at least in part on the relative location; and
transmitting, to the first UE, identifiers of the plurality of UEs.

21. The method of claim 18, wherein transmitting the reference signal configuration comprises:
transmitting one of a downlink reference signal configuration or an uplink reference signal configuration, information to the first UE; and
transmitting the other of the downlink reference signal configuration or the uplink reference signal configuration to the second UE.

22. The method of claim 18, further comprising:
transmitting, to the first UE and the second UE, directional beam information for the first UE, the second UE, or both.

23. The method of claim 18, further comprising:
transmitting, to the first UE and the second UE, timing offset information for the first UE, the second UE, or both.

24. The method of claim 18, further comprising:
receiving a coordination message that requests the network device to trigger a relay link beam sweep procedure with another UE, wherein the reference signal configuration is transmitted based at least in part on receiving the coordination message.

25. The method of claim 18, wherein the reference signal configuration indicates a synchronization signal block resource in which to perform a relay link beam sweep procedure.

26. The method of claim 18, further comprising:
transmitting an indication of a random access resource to the first UE, the second UE, or both.

27. The method of claim 18, further comprising:
identifying data to be transmitted to the first UE; and
transmitting the data to the second UE with instructions to forward to the data to the first UE via the relay link.

28. The method of claim 18, further comprising:
detecting a metric associated with a communication link between the network device and the first UE; and
transmitting the identifier of the second UE to the first UE based at least in part on detecting the metric.

29. An apparatus for wireless communication at a first user equipment (UE), comprising:
a processor,
memory in electronic communication with the processor; and
instructions stored in the memory and executable by the processor to cause the apparatus to:
receive, from a network device, an identifier of a second UE, the network device serving both the first UE and the second UE;
receive, from the network device, a reference signal configuration for establishing a relay link with the second UE, wherein the reference signal configuration indicates that the first UE is to transmit using a first plurality of beams during a relay link beam sweep procedure, receive using a second plurality of beams during the relay link beam sweep procedure, or both;

perform the relay link beam sweep procedure with the second UE based at least in part on the reference signal configuration and the identifier; and establish the relay link with the second UE based at least in part on the relay link beam sweep procedure.

30. An apparatus for wireless communication at a network device, comprising:

a processor, memory in electronic communication with the processor; and instructions stored in the memory and executable by the processor to cause the apparatus to:

transmit, to a first user equipment (UE), an identifier of a second UE;

transmit, to the first UE and the second UE, a reference signal configuration for performing a relay link beam sweep procedure for establishing a relay link between the first UE and the second UE, wherein the reference signal configuration indicates that the first UE is to transmit using a first plurality of beams during the relay link beam sweep procedure, receive using a second plurality of beams during the relay link beam sweep procedure, or both; and receive an indication, from at least one of the first UE or the second UE, that the relay link has been established between the first UE and the second UE.

\* \* \* \* \*